US007393074B2

(12) United States Patent
Yamazaki

(10) Patent No.: US 7,393,074 B2
(45) Date of Patent: Jul. 1, 2008

(54) INKJET RECORDING APPARATUS AND IMAGE FORMING METHOD UTILIZING LOCAL VARIATION PROCESSING PARAMETERS

(75) Inventor: Yoshirou Yamazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 276 days.

(21) Appl. No.: 10/932,020

(22) Filed: Sep. 2, 2004

(65) Prior Publication Data

US 2005/0046653 A1 Mar. 3, 2005

(30) Foreign Application Priority Data

Sep. 3, 2003 (JP) ............................ 2003-311484

(51) Int. Cl.
*B41J 2/205* (2006.01)
*G06F 15/00* (2006.01)

(52) U.S. Cl. .......................................... 347/15; 358/1.9

(58) Field of Classification Search .................. 347/15; 358/1.9

See application file for complete search history.

(56) References Cited

U.S. PATENT DOCUMENTS 6,046,822 A * 4/2000 Wen et al. .................... 358/1.9
6,352,328 B1 * 3/2002 Wen et al. ..................... 347/15
6,390,583 B1 * 5/2002 Kato et al. .................... 347/15
6,607,260 B1 * 8/2003 Ikeda .......................... 347/19
6,707,579 B1 3/2004 Komiya et al.
2001/0038397 A1 11/2001 Kobayashi et al.
2002/0021325 A1 2/2002 Koitabashi et al.
2002/0080375 A1 * 6/2002 Waldner et al. .............. 358/1.9
2003/0210431 A1 * 11/2003 Rylander .................. 358/3.06

FOREIGN PATENT DOCUMENTS

JP 2000-52571 A 2/2000
JP 2001-260350 A 9/2001
JP 2002-19101 A 1/2002
JP 2002-86767 A 3/2002
JP 2002-234216 A 8/2002

* cited by examiner

*Primary Examiner*—Stephen D. Meier
*Assistant Examiner*—Rene Garcia, Jr.
(74) *Attorney, Agent, or Firm*—Birch, Stewart, Kolasch & Birch, LLP

(57) ABSTRACT

An inkjet recording apparatus has a recording head which has a nozzle row composed of a plurality of nozzles for ejecting ink, a storage device which stores local variation processing parameters determined according to nozzle locality showing displacement from an ideal state of dot depositions due to defectiveness of the nozzles, a digital halftoning processing device which converts inputted image data to dot data, a local variation processing device which varies the dot data obtained by the digital halftoning processing device so as to compensate the nozzle locality by using the local variation processing parameters stored in the storage device, and a control device which controls ink ejection of the plurality of nozzles of the recording head according to the dot data generated through processing by the local variation processing device.

12 Claims, 22 Drawing Sheets

PRIOR ART

INKJET RECORDING APPARATUS AND IMAGE FORMING METHOD UTILIZING LOCAL VARIATION PROCESSING PARAMETERS

BACKGROUND OF THE INVENTION

This Non-provisional application claims priority under 35 U.S.C. § 119(a) on Patent Application No(s). 2003-311484 filed in Japan on Sep. 3, 2003, the entire contents of which are hereby incorporated by reference.

1. Field of the Invention

The present invention relates to an inkjet recording apparatus and image forming method, and more particularly to an inkjet recording apparatus equipped with a recording head having nozzle rows in which a plurality of nozzles serving as ink ejection ports are arranged, and to an image forming method thereof.

2. Description of the Related Art

Inkjet recording apparatuses have an inkjet head (print head) in which a large number of nozzles are arranged, and form images on a printing medium such as recording paper by ejecting ink from the nozzles while moving the print head and the printing medium relatively to each other. In such inkjet recording apparatuses, there are cases in which some of the large number of nozzles no longer eject ink for some reason, the amount of ink ejected (the dot size resulting from the ejection of an ink-droplet on the recording paper) or the flight direction of the ink-droplet (i.e., ink-droplet deposition position) becomes defective, and other ejection defects occur. The defective ejection of such nozzles causes the quality of the recorded images to be degraded. In the present specification, displacement from the ideal state related to the dot position, dot size, dot shape, dot density distribution, and the like due to defective ejection from nozzles is referred to as "locality of nozzles" or "nozzle locality".

Inkjet recording apparatuses operate using a shuttle-scan method whereby images are formed as the recording head reciprocates in a direction (main scanning direction) substantially perpendicular to the conveyance direction of the print medium, and a one-pass (single pass) method whereby images are formed by a single conveyance of the medium alone in the sub-scanning direction using a full-line recording head having a nozzle row that covers the entire width of the print medium in the main scanning direction. Each of these methods handles a locality of nozzles in a different manner.

In the case of the shuttle-scan method, dots can be formed by ink-droplet ejection from different nozzles on the same sub-scanning line or in the vicinity thereof because the recording head reciprocates in the main scanning direction. In other words, the locality of nozzles is dispersed by multiple passes in the shuttle-scan method, and dot placement in which streak-type nonuniformity or the like is visually less noticeable can be realized.

In contrast, the recording head is fixed in the one-pass method, so that it is impossible to disperse the locality of nozzles through head movement as with the above-described multiple passes. There is hence a drawback in that nonuniformity in the form of lines can be visually detected and the image quality is markedly degraded.

Japanese Patent Application Publication No. 2002-234216 discloses, with respect to the drawbacks that are unique to the one-pass method, art that determines the locality of nozzles and determines a dot control value so that displacement is visually less noticeable with consideration for the locality of nozzles (mainly positional displacement and color value displacement) during digital halftoning. In Japanese Patent Application Publication No. 2002-234216, digital halftoning is carried out with consideration for the locality of nozzles, and dots are ejected with minimum visible variation by controlling the driving action of the print head in accordance with the results thereof as shown in FIG. 26, so that dot deposition in which the visibility of nonuniformity is inhibited in accordance with the results.

Nevertheless, in the case of the method disclosed in Japanese Patent Application Publication No. 2002-234216, the dot control value is determined with the content of the image to be printed taken into account, and calculations in which the nozzle locality and the appearance of the image are constantly taken into consideration must be carried out. There is therefore a drawback in that the constant calculating load is considerable, and the memory capacity must be expanded.

SUMMARY OF THE INVENTION

The present invention has been implemented taking into account the above described circumstances, and an object thereof is to provide an inkjet recording apparatus that can reduce the streak-type nonuniformity brought about by the locality of nozzles and can reduce the calculating load in comparison with the prior art, and to provide an image recording method thereof.

In order to attain the above described object, the present invention is directed to an inkjet recording apparatus, comprising: a recording head which has a nozzle row composed of a plurality of nozzles for ejecting ink; a storage device which stores local variation processing parameters determined according to nozzle locality showing displacement from an ideal state of dot depositions due to defectiveness of the nozzles; a digital halftoning processing device which converts inputted image data to dot data; a local variation processing device which varies the dot data obtained by the digital halftoning processing device so as to compensate the nozzle locality by using the local variation processing parameters stored in the storage device; and a control device which controls ink ejection of the plurality of nozzles of the recording head according to the dot data generated through processing by the local variation processing device.

In accordance with the present invention, digital halftoning processing is performed unrelated to (independently from) the processing of the locality compensation of nozzles, and local variation processing in which the locality of nozzles into consideration is taken into account is carried out for the results of digital halftoning. Processing parameters that produce local variations with respect to the results of halftoning can be calculated once and stored in the storage device, and the calculating load can be reduced in comparison with conventional methods.

In an aspect of the present invention, the recording head can be a full-line recording head having at least one nozzle row in which a plurality of nozzles serving as ink ejection ports are arranged along a length corresponding to an entire width of a printing medium in a direction substantially perpendicular to a conveyance direction of the printing medium.

The present invention is also applicable to cases where a recording is performed by carrying out a plurality of scanning while a recording head that has a nozzle row shorter than an entire width of a printing medium is moved in a widthwise direction of the printing medium.

The "full-line recording head" is normally disposed along the direction perpendicular to the relative conveyance direction of the printing medium (the conveyance direction), but also possible is an aspect in which the recording head is disposed along the diagonal direction given a predetermined angle with respect to the direction perpendicular to the conveyance direction. The arrangement of the image-recording elements in the recording head is not limited to a single row array in the form of a line, but a matrix array composed of a plurality of rows is also possible. Furthermore, also possible is an aspect in which a plurality of short-length recording head units having a row of image-recording elements that do not have lengths that correspond to the entire width of the printing medium are combined and the nozzle rows (the image-recording element rows) are configured so as to correspond to the entire width of the printing medium, with these units acting as a whole.

The "printing medium" is a medium that receives printing from the recording head and may be referred to as an image formation receiving medium, recording receiving medium, image receiving medium, recording medium, recording media, and the like. Specific aspects of the printing medium include continuous paper, cut paper, seal paper, resin sheets such as sheets used for overhead projectors (OHP), film, cloth, and various other media without regard to materials or shapes.

The conveyance device for moving the printing medium with respect to the recording head includes an aspect in which the printing medium is conveyed with respect to a stationary (fixed) recording head, an aspect in which the recording head is moved with respect to a stationary printing medium, or an aspect in which both the recording head and the printing medium are moved.

In the present specification, the term "printing" expresses the concept of not only the formation of characters, but also the formation of images with a broad meaning that includes characters.

The inkjet recording apparatus related to an aspect of the present invention further comprises: an image reading device which acquires image information by reading an image formed on a print medium by the ink ejected from the nozzles of the print head; a locality determination device which determines the nozzle locality according to the image information acquired by the image reading device; and a calculating device which calculates the local variation processing parameters for compensating the nozzle locality according to the nozzle locality determined by the locality determination device.

A test print or an actual image (the result of printing the target image of actually required print output) is read by the image reading device as required at the time of shipment from the factory or at any time thereafter, and the nozzle locality is determined from the acquired image information. The local variation processing parameters are calculated from the determined locality of nozzles, and the resulting data is stored in the storage device.

In accordance with another aspect of the present invention, the local variation processing device varies at least one of a dot size and a dot position.

The nozzle locality can be compensated by appropriately imparting variation to the dot size or the dot position, or both of these.

In accordance with yet another aspect of the present invention, the local variation processing parameters include at least one of a dot position variation amount and a dot size variation amount; the storage device stores a matrix table defining the local variation processing parameters corresponding to each ink-droplet deposition position; and the local variation processing device receives at least one of a dot position and a dot size obtained by the digital halftoning processing device, and generates an output in which the at least one of the dot position and the dot size is varied according to the matrix table.

The matrix table is preferably obtained by calculation as the dot density is sequentially increased. It is thereby possible to favorably reduce streak-type nonuniformity for intermediate dot densities as well.

In a specific aspect of the present invention, the matrix table is determined so as to satisfy prescribed conditions for at least one index from among an index related to visibility of dot placement and an index related to anisotropy of the dot placement.

In order to attain the above described object, the present invention is also directed to an image forming method of forming an image on a printing medium using a recording head having a nozzle row composed of a plurality of nozzles for ejecting ink, the method comprising: a locality determining step of determining nozzle locality showing displacement from an ideal state of dot depositions due to defectiveness of the nozzles; a calculating step of calculating local variation processing parameters for compensating the nozzle locality according to the nozzle locality determined in the locality determining step; a storing step of storing, in a storage device, the local variation processing parameters calculated in the calculating step; a digital halftoning processing step of converting inputted image data to dot data with a digital halftoning method; a local variation processing step of varying the dot data obtained in the digital halftoning processing step so as to compensate the nozzle locality by using the local variation processing parameters stored in the storage device; and a control step of controlling ink ejection of the plurality of nozzles of the recording head according to the dot data generated in the local variation processing step.

In accordance with the present invention as described above, the processing for compensating the locality of nozzles is separated from the processing for digital halftoning, so that the calculating load for digital halftoning can be reduced, and the required memory capacity can be reduced in the inkjet recording apparatus equipped with the recording head having the nozzle row in which the plurality of nozzles are arranged. Moreover, this configuration is advantageous in that digital halftoning can be independently designed without any relation to the locality of the nozzle.

Furthermore, in accordance with the present invention, compensating the locality of nozzles is handled by local variation processing independently from digital halftoning, so that it is sufficient to modify the content of local variation processing when the nozzle locality is changed as a result of a head replacement or the passage of time.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Configuration of an Inkjet Recording Apparatus

Figure 1:
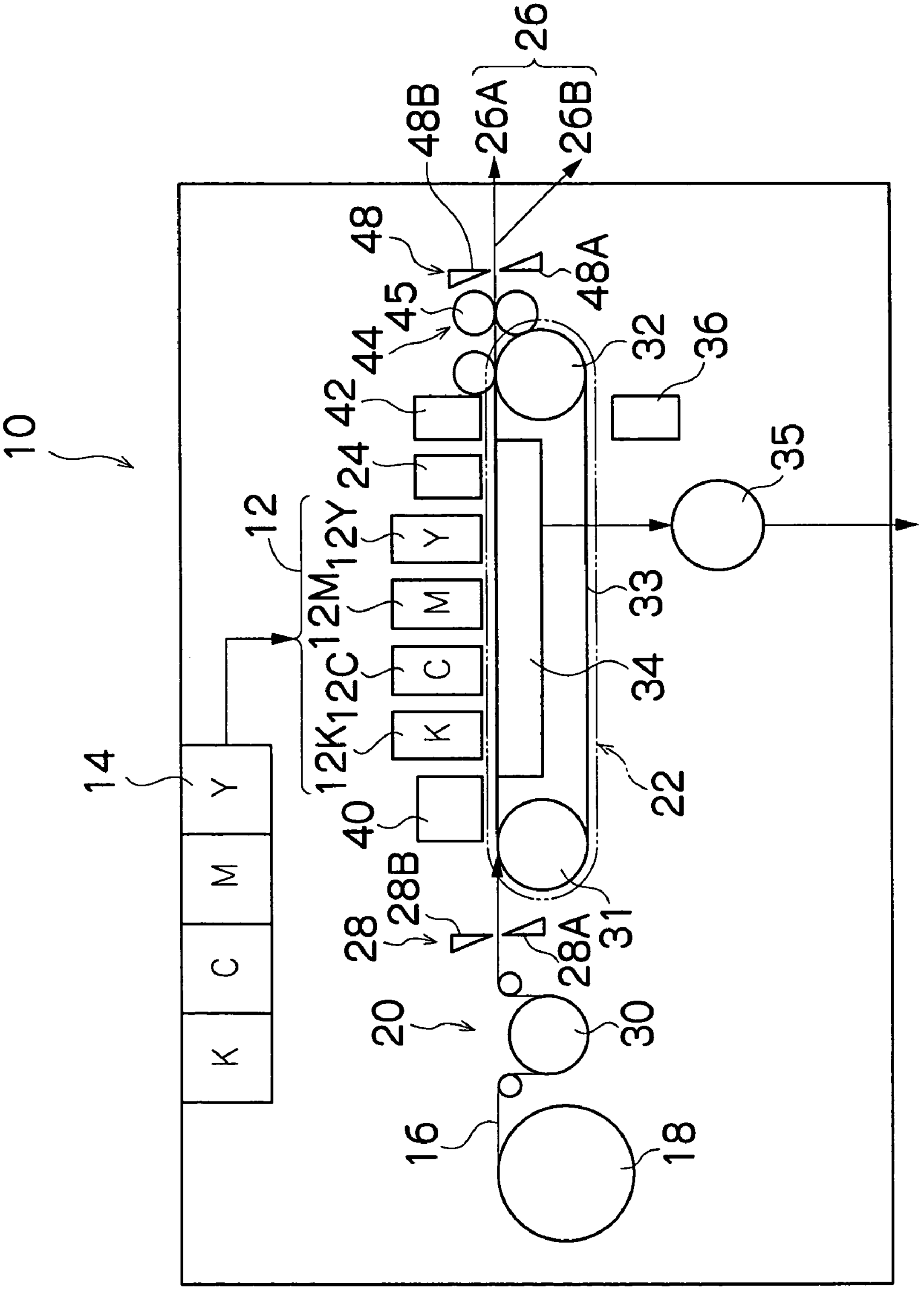
FIG. 1 is a general schematic drawing of an inkjet recording apparatus according to an embodiment of the present invention.

FIG. 1 is a general schematic drawing of an inkjet recording apparatus according to an embodiment of the present invention. As shown in FIG. 1, the inkjet recording apparatus 10 comprises: a printing unit 12 having a plurality of print heads 12K, 12C, 12M, and 12Y for ink colors of black (K), cyan (C), magenta (M), and yellow (Y), respectively; an ink storing/loading unit 14 for storing inks to be supplied to the print heads 12K, 12C, 12M, and 12Y; a paper supply unit 18 for supplying recording paper 16; a decurling unit 20 for removing curl in the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

In FIG. 1, a single magazine for rolled paper (continuous paper) is shown as an example of the paper supply unit 18; however, a plurality of magazines with paper differences such as paper width and quality may be jointly provided. Moreover, paper may be supplied with a cassette that contains cut paper loaded in layers and that is used jointly or in lieu of a magazine for rolled paper.

In the case of a configuration in which a plurality of types of recording paper can be used, it is preferable that a information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is equal to or greater than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut paper is used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction with a fan 35 to generate a negative pressure, and the recording paper 16 is held on the belt 33 by suction. The belt 33 is driven in the clockwise direction in FIG. 1 by the motive force of a motor (not shown in FIG. 1, but shown as a motor 88 in FIG. 6) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not depicted, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
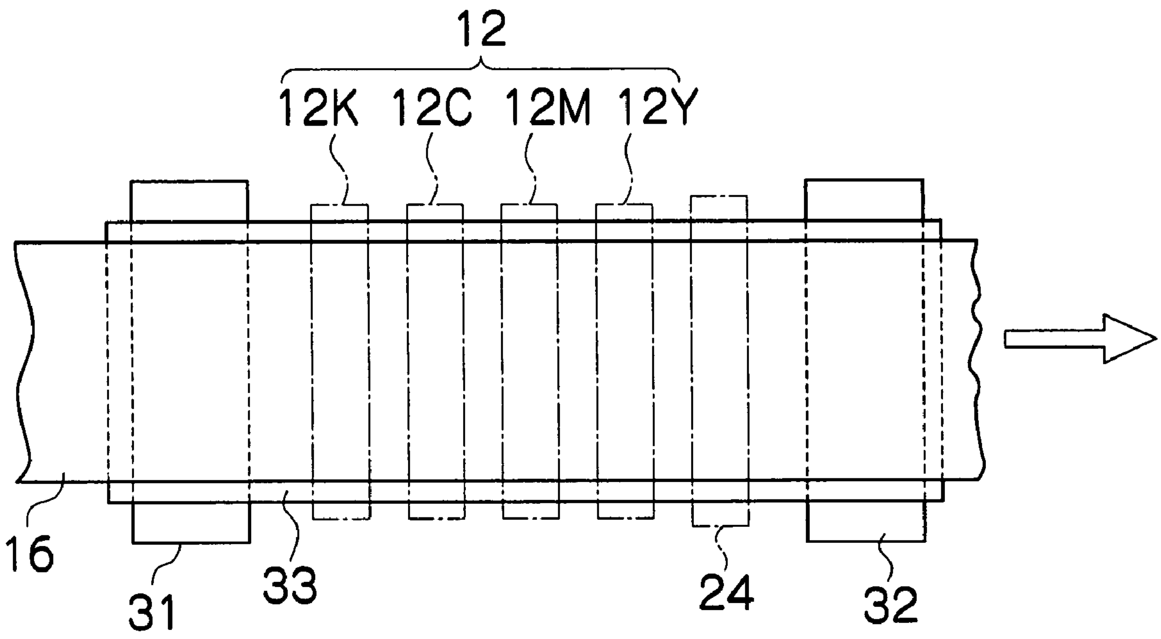
FIG. 2 is a plan view of principal components of an area around a printing unit of the inkjet recording apparatus in FIG. 1.

As shown in FIG. 2, the printing unit 12 forms a so-called full-line head in which a line head having a length that corresponds to the maximum paper width is disposed in the main scanning direction perpendicular to the conveyance direction of the recording paper 16 (hereinafter referred to as the paper conveyance direction) represented by the arrow in FIG. 2, which is substantially perpendicular to a width direction of the recording paper 16. A specific structural example is described later with reference to FIGS. 3A to 5. Each of the print heads 12K, 12C, 12M, and 12Y is composed of a line head, in which a plurality of ink-droplet ejection apertures (nozzles) are arranged along a length that exceeds at least one side of the maximum-size recording paper 16 intended for use in the inkjet recording apparatus 10, as shown in FIG. 2.

The print heads 12K, 12C, 12M, and 12Y are arranged in this order from the upstream side along the paper conveyance direction. A color print can be formed on the recording paper 16 by ejecting the inks from the print heads 12K, 12C, 12M, and 12Y, respectively, onto the recording paper 16 while conveying the recording paper 16.

Although the configuration with the KCMY four standard colors is described in the present embodiment, combinations of the ink colors and the number of colors are not limited to those, and light and/or dark inks can be added as required. For example, a configuration is possible in which print heads for ejecting light-colored inks such as light cyan and light magenta are added. Moreover, a configuration is possible in which a single print head adapted to record an image in the colors of CMY or KCMY is used instead of the plurality of print heads for the respective colors.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

As shown in FIG. 1, the ink storing/loading unit 14 has tanks for storing the inks to be supplied to the print heads 12K, 12C, 12M, and 12Y, and the tanks are connected to the print heads 12K, 12C, 12M, and 12Y through channels (not shown), respectively. The ink storing/loading unit 14 has a warning device (e.g., a display device, an alarm sound generator) for warning when the remaining amount of any ink is low, and has a mechanism for preventing loading errors among the colors.

The print determination unit 24 has an image sensor for capturing an image of the ink-droplet deposition result of the print unit 12, and functions as a device to check for ejection defects such as clogs of the nozzles in the print unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements, which are arranged two-dimensionally.

The print determination unit 24 reads a test pattern printed with the print heads 12K, 12C, 12M, and 12Y for the respective colors, and the ejection of each head is determined. The ejection determination includes the presence of the ejection, measurement of the dot size, and measurement of the dot deposition position. The details of the ejection determination are described later.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, a sorter for collecting prints according to print orders is provided to the paper output unit 26A for the target prints.

Next, the structure of the print heads is described. The print heads 12K, 12C, 12M, and 12Y provided for the ink colors have the same structure, and a reference numeral 50 is hereinafter designated to any of the print heads 12K, 12C, 12M, and 12Y.

Figure 3A:
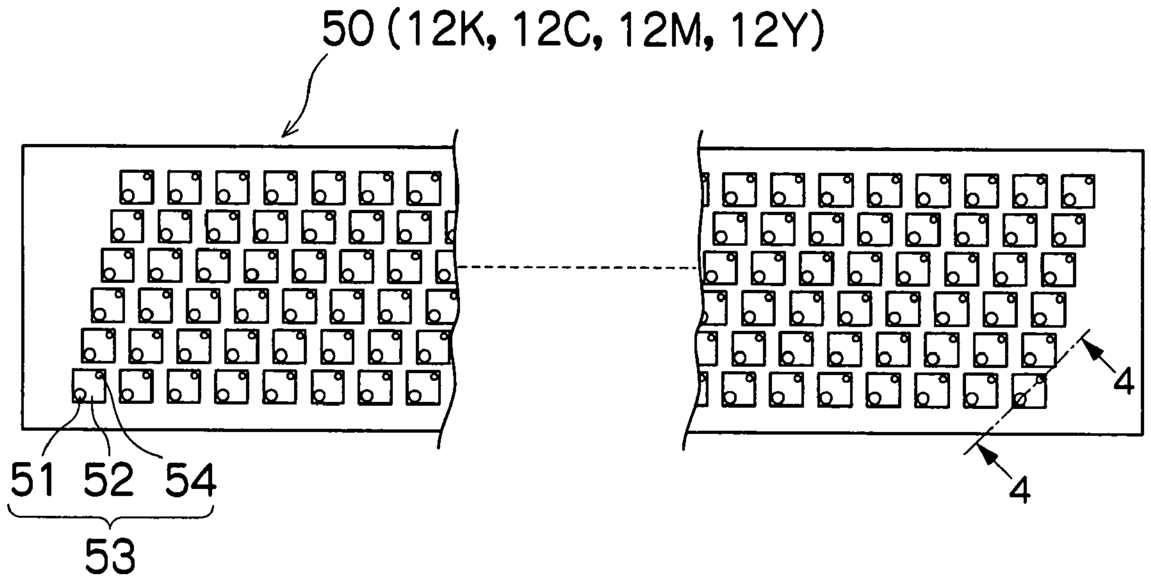
FIG. 3A is a perspective plan view showing an example of a configuration of a print head.
Figure 3B:
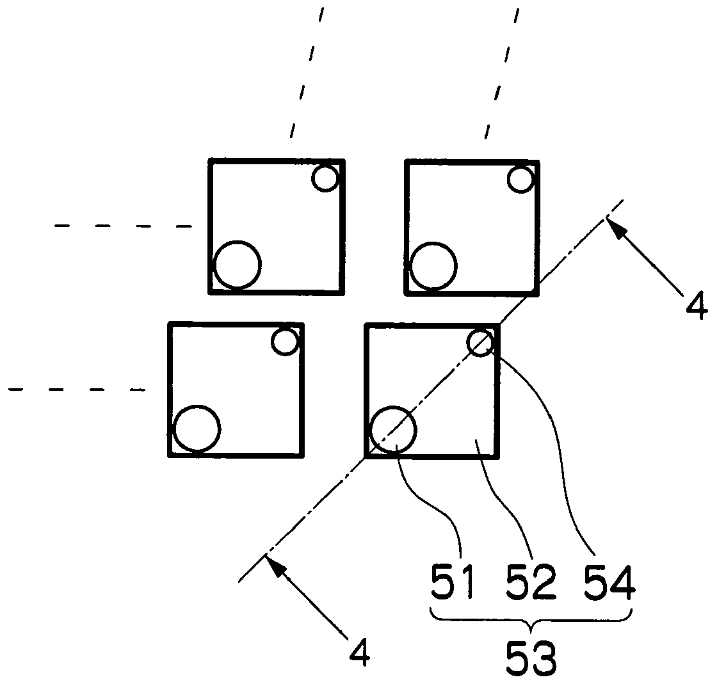
FIG. 3B is a partial enlarged view of FIG. 3A.
Figure 4:
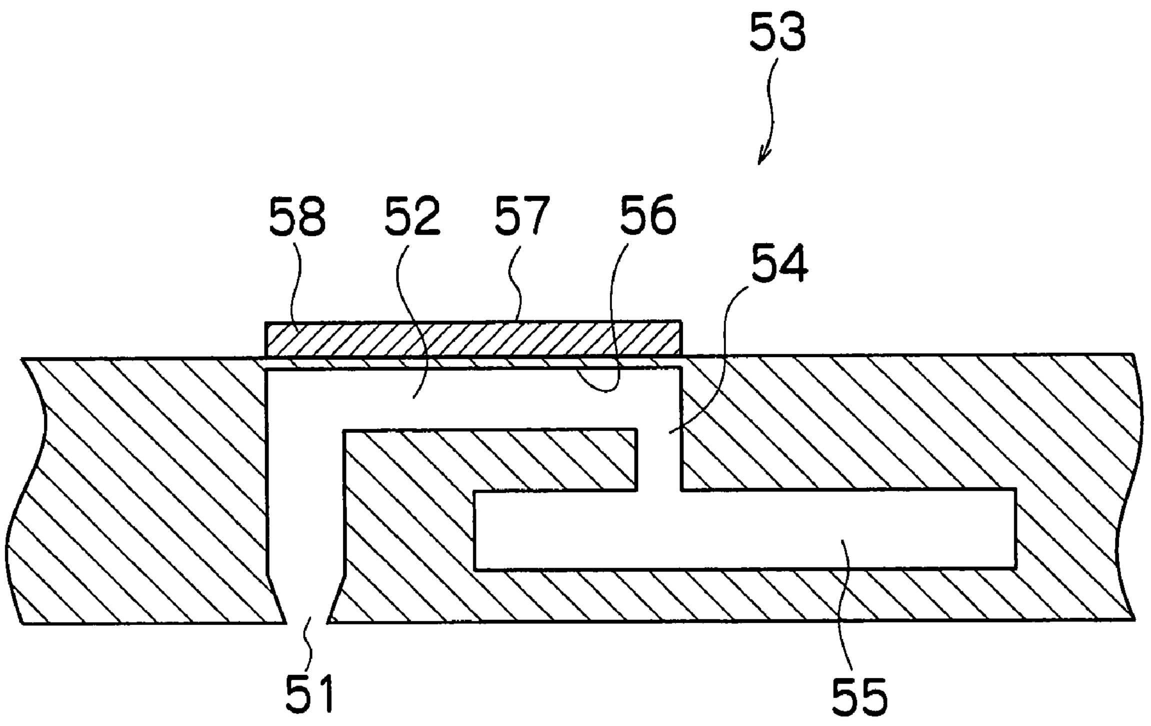
FIG. 4 is a cross-sectional view along a line 4-4 in FIGS. 3A and 3B.

FIG. 3A is a perspective plan view showing an example of the configuration of the print head 50, FIG. 3B is an enlarged view of a portion thereof, and FIG. 4 is a cross-sectional view taken along the line 4-4 in FIGS. 3A and 3B, showing the inner structure of an ink chamber unit. The nozzle pitch in the print head 50 should be minimized in order to maximize the density of the dots printed on the surface of the recording paper. As shown in FIGS. 3A, 3B and 4, the print head 50 in the present embodiment has a structure in which a plurality of ink chamber units 53 including nozzles 51 for ejecting ink-droplets and pressure chambers 52 connecting to the nozzles 51 are disposed in the form of a staggered matrix, and the effective nozzle pitch is thereby made small.

The planar shape of the pressure chamber 52 provided for each nozzle 51 is substantially a square, and the nozzle 51 and supply port 54 are disposed in both corners on a diagonal line of the square. Each pressure chamber 52 is connected to a common channel 55 through a supply port 54.

An actuator 58 having a discrete electrode 57 is joined to a pressure plate 56, which forms the ceiling of the pressure chamber 52, and the actuator 58 is deformed by applying drive voltage to the discrete electrode 57 to eject ink from the nozzle 51. When ink is ejected, new ink is delivered from the common flow channel 55 through the supply port 54 to the pressure chamber 52.

Figure 5:
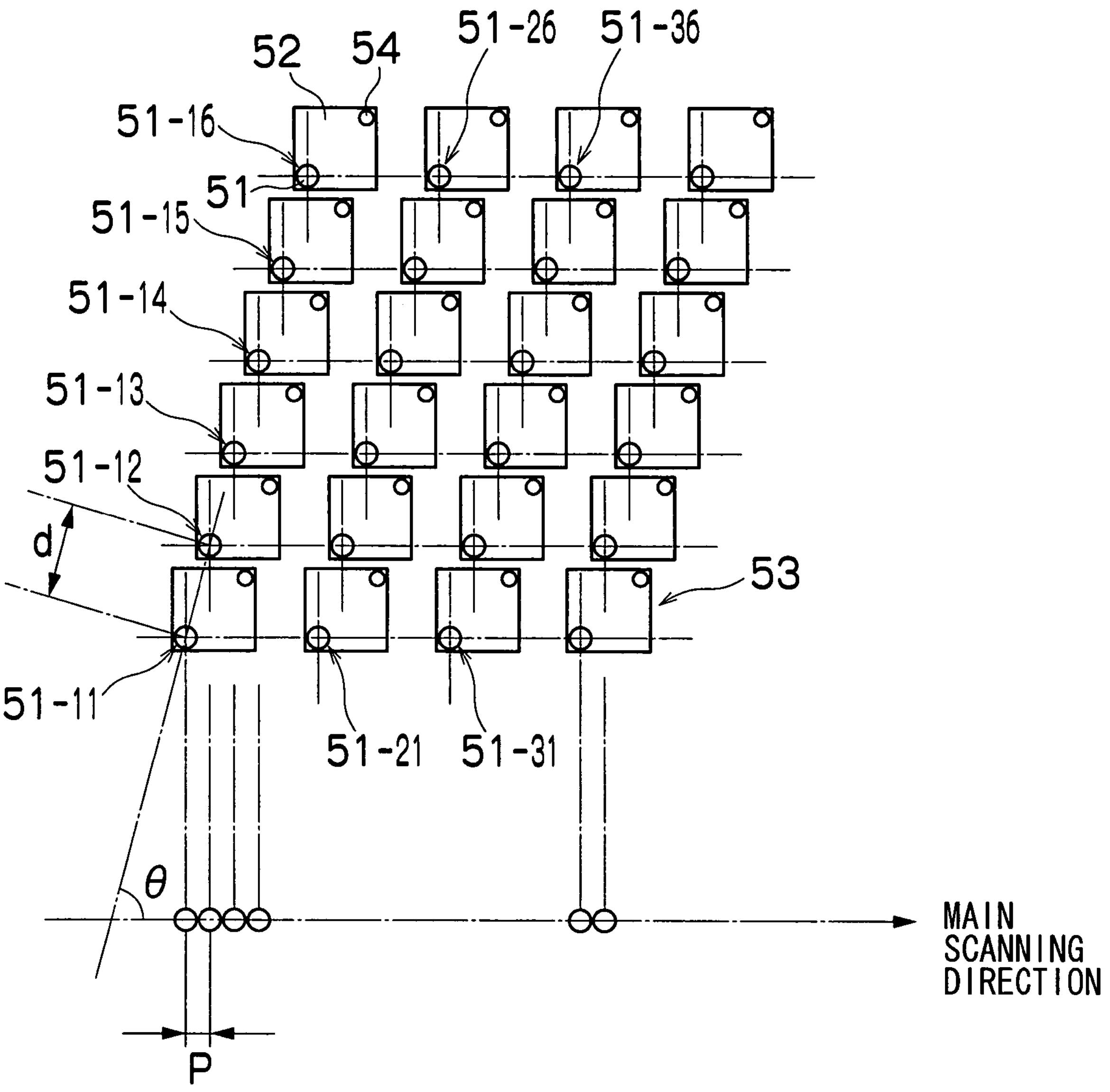
FIG. 5 is an enlarged view showing nozzle arrangement of the print head in FIG. 3A.

The plurality of ink chamber units 53 having such a structure are arranged in a grid with a fixed pattern in the line-printing direction along the main scanning direction and in the diagonal-row direction forming a fixed angle θ that is not a right angle with the main scanning direction, as shown in FIG. 5. With the structure in which the plurality of rows of ink chamber units 53 are arranged at a fixed pitch d in the direction at the angle θ with respect to the main scanning direction, the nozzle pitch P as projected in the main scanning direction is d×cos θ.

Hence, the nozzles 51 can be regarded to be equivalent to those arranged at a fixed pitch P on a straight line along the main scanning direction. Such configuration results in a nozzle structure in which the nozzle row projected in the main scanning direction has a high density of up to 2,400 nozzles per inch. For convenience in description, the structure is described below as one in which the nozzles 51 are arranged at regular intervals (pitch P) in a straight line along the lengthwise direction of the head 50, which is parallel with the main scanning direction.

In a full-line head comprising rows of nozzles that have a length corresponding to the maximum recordable width, the "main scanning" is defined as to print one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block, . . . ); and one line is printed in the width direction of the recording paper 16 by sequentially driving the nozzles 51-11, 51-12, . . . , 51-16 in accordance with the conveyance velocity of the recording paper 16.

On the other hand, the "sub-scanning" is defined as to repeatedly perform printing of one line (a line formed of a row of dots, or a line formed of a plurality of rows of dots) formed by the main scanning, while moving the full-line head and the recording paper relatively to each other.

In the implementation of the present invention, the structure of the nozzle arrangement is not particularly limited to the examples shown in the drawings. Moreover, the present embodiment adopts the structure that ejects ink-droplets by deforming the actuator 58 such as a piezoelectric element; however, the implementation of the present invention is not particularly limited to this. Instead of the piezoelectric inkjet method, various methods may be adopted including a thermal inkjet method in which ink is heated by a heater or another heat source to generate bubbles, and ink-droplets are ejected by the pressure thereof.

Figure 6:
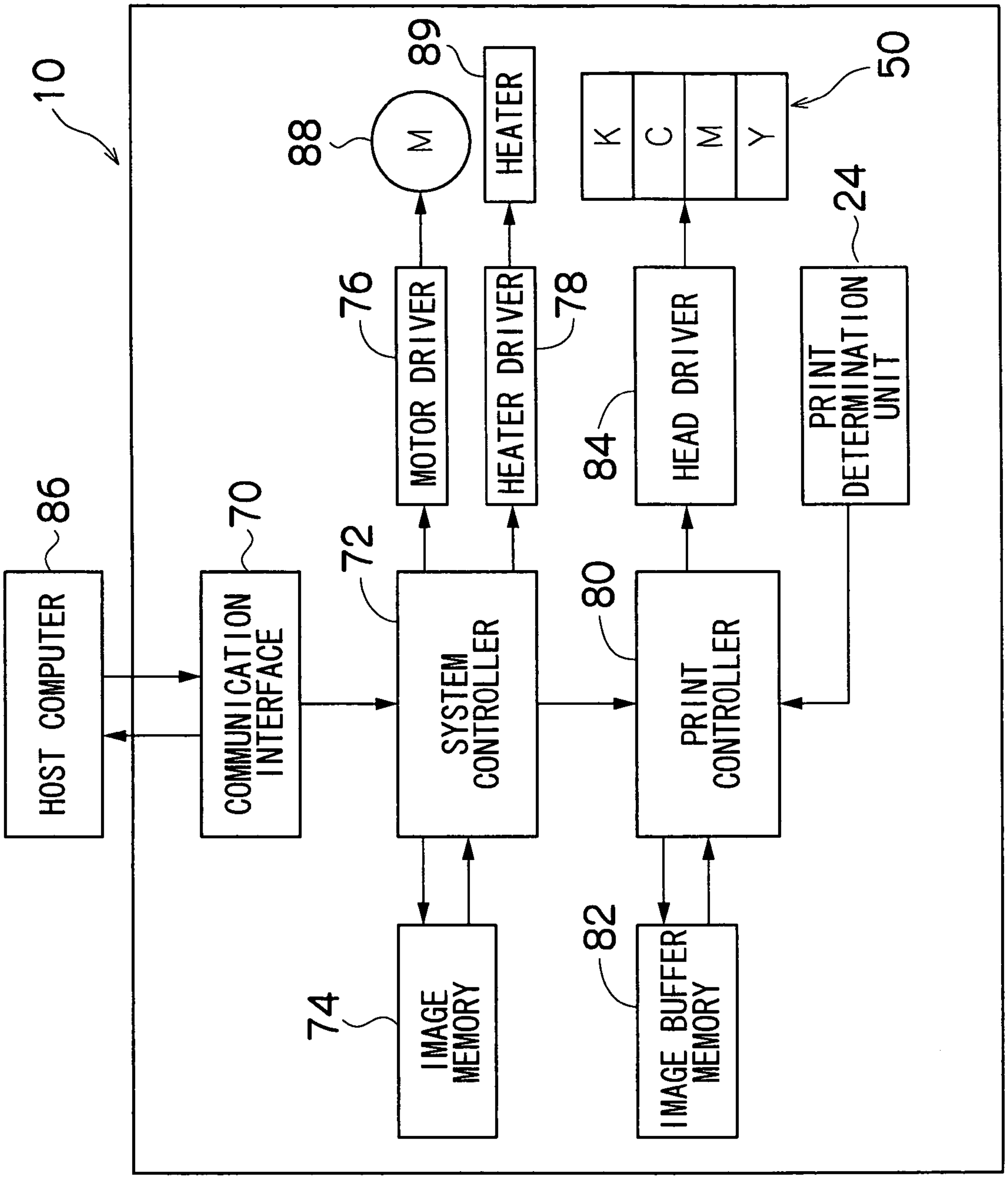
FIG. 6 is a block diagram of principal components showing a system configuration of the inkjet recording apparatus.

FIG. 6 is a block diagram of the principal components showing the system configuration of the inkjet recording apparatus 10. The inkjet recording apparatus 10 has a communication interface 70, a system controller 72, an image memory 74, a motor driver 76, a heater driver 78, a print controller 80, an image buffer memory 82, a head driver 84, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 controls the communication interface 70, image memory 74, motor driver 76, heater driver 78, and other components. The system controller 72 has a central processing unit (CPU), peripheral circuits therefor, and the like. The system controller 72 controls communication between itself and the host computer 86, controls reading and writing from and to the image memory 74, and performs other functions, and also generates control signals for controlling a heater 89 and the motor 88 in the conveyance system. The image memory 74 serves as the temporary memory for the image data and also as the space for unwinding programs and the working space for computation of the CPU.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to apply the generated print control signals (print data) to the head driver 84. Required signal processing is performed in the print controller 80, and the ejection timing and ejection amount of the ink-droplets from the print head 50 are controlled by the head driver 84 on the basis of the image data. Desired dot sizes and dot placement can be brought about thereby.

The print controller 80 is provided with the image buffer memory 82; and image data, parameters, and other data are temporarily stored in the image buffer memory 82 when image data is processed in the print controller 80. The aspect shown in FIG. 6 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives actuators for the print heads 12K, 12C, 12M, and 12Y of the respective colors on the basis of the print data received from the print controller 80. A feedback control system for keeping the drive conditions for the print heads constant may be included in the head driver 84.

The image data to be printed is externally inputted through the communication interface 70, and is stored in the image memory 74. In this stage, the RGB image data is stored in the image memory 74.

The image data stored in the image memory 74 is sent to the print controller 80 through the system controller 72, and is converted to the dot data for each color by a known random dithering algorithm or another technique in the print controller 80. In other words, the print controller 80 performs a processing for converting the inputted RGB image data to the dot data for the four colors of CMYK. The dot data generated by the print controller 80 is stored in the image buffer memory 82.

The head driver 84 acquires the dot data stored in the image buffer memory 82, generates drive control signals for the print head 50 according to the acquired dot data, and applies the drive control signals to the print head 50. The print head 50 ejects ink-droplets according to the drive control signals applied from the head driver 84. An image is formed on the recording paper 16 by controlling the ink-droplet ejection from the print head 50 in synchronization with the conveyance velocity of the recording paper 16.

The print determination unit 24 is a block that includes the line sensor as described above with reference to FIG. 1, reads the image printed on the recording paper 16, determines the print conditions (presence of the ejection, variation in the dot deposition, and the like) by performing desired signal processing, or the like, and provides the determination results of the print conditions to the print controller 80.

The print controller 80 makes various compensation with respect to the print head 50 as required on the basis of the information obtained from the print determination unit 24.

Figure 7:
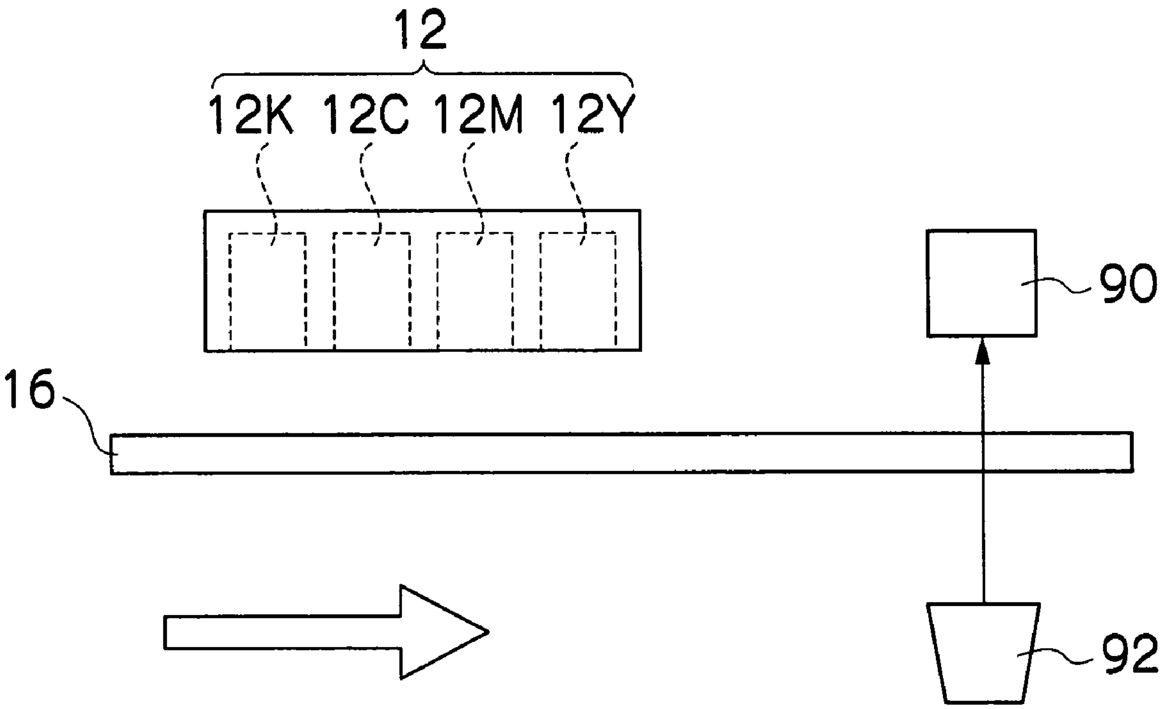
FIG. 7 is a drawing showing an example of another arrangement of a light source for illumination.

In the embodiment shown in FIG. 1, a configuration is adopted in which the print determination unit 24 is disposed on the printed surface side, the printed surface is illuminated by a cold-cathode tube or other light source (not shown) disposed in the vicinity of the line sensor, and the light reflected on the printed surface is read with the line sensor. However, as shown in FIG. 7, also possible in the implementation of the present invention is a configuration in which a line sensor 90 and a light source 92 are set facing each other across the conveyance pathway of the recording paper 16, the light source 92 emits light from the reverse side of the recording paper 16 (opposite of the surface on which ink-droplets are deposited); and the amount of light transmitted through the recording paper 16 is read with the line sensor 90. The configuration with the transmission-type determination shown in FIG. 7 has an advantage in that the image blur acquired by the line sensor can be reduced in comparison with the configuration with the reflection-type determination.

However, in the case of the transmission-type configuration, the amount of light that enters the line sensor can be less than in the reflection-type configuration. Situations can be envisioned in which the amount of incident light is reduced in the reflection-type configuration as well. In either case, when the amount of light that enters the line sensor is small, an adequate determination signal cannot be obtained; however, since high resolution in the paper conveyance direction is not required when an image is read with the line sensor, the situation can be handled by lengthening the charge accumulation time of the line sensor, or by integrating the obtained data in the paper conveyance direction.

The read start timing for the line sensor is determined from the distance between the line sensor and the nozzles and the conveyance velocity of the recording paper 16.

Description of Image Formation Processing

Figure 8:
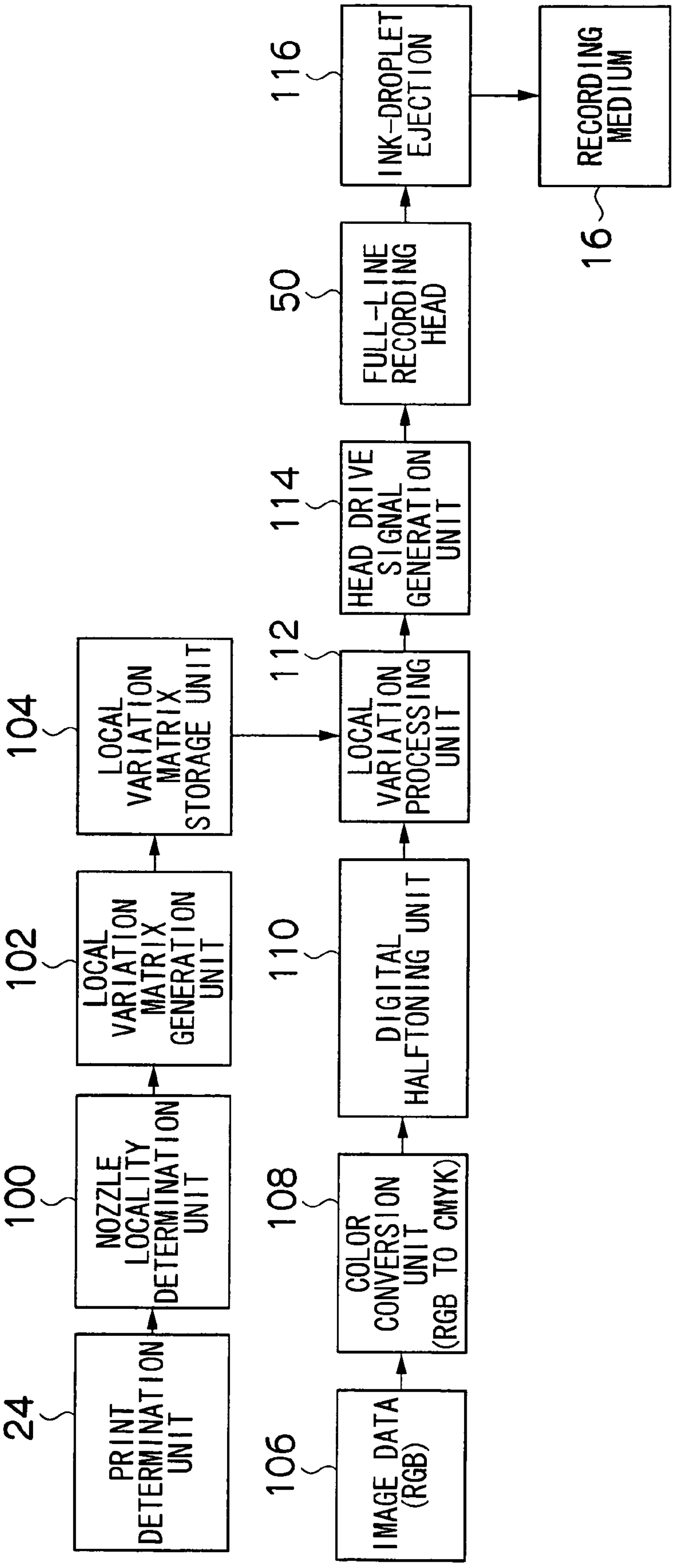
FIG. 8 is a block diagram of principal components showing a functional configuration of the inkjet recording apparatus.

Next, the operation of the inkjet recording apparatus with the above configuration is described. FIG. 8 is a block diagram showing the functional configuration of the principal components of the inkjet recording apparatus 10 according to the present embodiment.

As shown in FIG. 8, the inkjet recording apparatus 10 has a nozzle locality determination unit 100 for determining the nozzle locality on the basis of determination information obtained from the print determination unit 24, a local variation matrix generation unit 102 for generating a matrix table to be used in the compensation of determined nozzle localities (hereinafter referred to as "local variation matrix"), and a local variation matrix storage unit 104 for storing the generated local variation matrix.

The inkjet recording apparatus 10 has a color conversion unit 108 for generating CMYK data from the inputted image data (RGB data) 106, a digital halftoning unit 110, a local variation processing unit 112, a head drive signal generation unit 114, and other components. The inkjet recording apparatus 10 applies local variation with consideration given to the nozzle locality with respect to the results of digital halftoning, generates a drive signal for the print head on the basis of the results of the local variation processing, applies the drive signal to the full-line recording head (the print head 50), carries out the desired ink-droplet ejection 116, and thereby records the image onto the recording medium (the recording paper 16).

The image data (RGB data) 106 to be printed is inputted to the inkjet recording apparatus 10 through a communication interface or another predetermined image input unit, as described in FIG. 6, and is sent to the color conversion unit 108 shown in FIG. 8. The color conversion unit 108 performs processing that converts the RGB data of each pixel in the image to corresponding CMYK data. The CMYK data generated in the color conversion unit 108 is subjected to gradation correction or other processing, and is thereafter sent to the digital halftoning unit 110.

The digital halftoning unit 110 is a processing unit that converts the CMYK data into a dot pattern. In the inkjet recording apparatus 10, the data must be converted to the dot pattern in which the gradation (image shades) of the inputted digital image is reproduced as faithfully as possible in order to form an image with a pseudo-continuous gradation for the human eye by varying deposition density and size of fine dots produced by the inks (color materials). The digital halftoning unit 110 generates the dot pattern from the inputted image data using a halftoning technique such as the dither method, random dither method, or blue noise mask method.

The results obtained by the digital halftoning unit 110 are sent to the local variation processing unit 112, which performs local variation processing using the local variation matrix. The method of creating the local variation matrix will be described later, and the method of local variation processing is hereinafter described. In order to simplify the description, the case of a single ink (a single color) is described.

Figure 9:
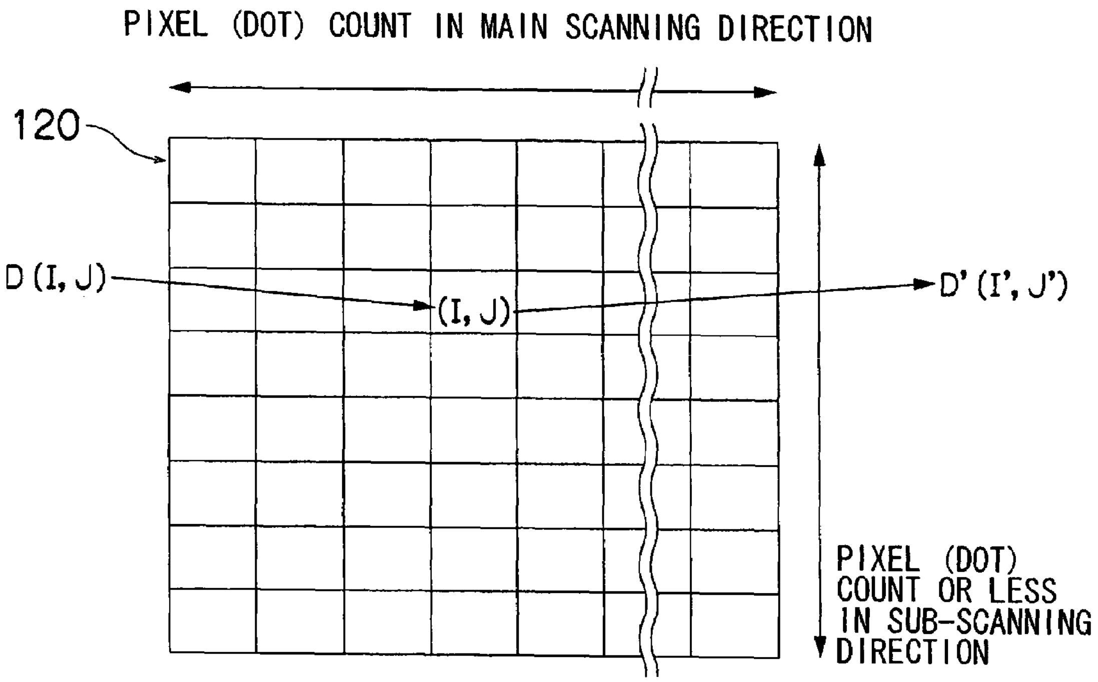
FIG. 9 is a conceptual drawing showing an example of local variation processing.

FIG. 9 is a conceptual drawing showing an example of local variation processing. The local variation matrix 120 is a matrix table with a designated conversion rule for converting the digital halftoning result D(I, J) to D'(I', J'), and is a matrix with a one-to-one correspondence for each dot deposition position (I, J) on a print job. The alignment of cells in the lateral direction in FIG. 9 corresponds to the arrangement of all dot deposition points (pixels) in the main scanning direction of the one-pass method, and has columns corresponding to the entire number of dot deposition points (pixel count) in the main scanning direction. The alignment of cells in the longitudinal direction in FIG. 9 corresponds to the arrangement of dot deposition points in the sub-scanning direction. It is sufficient that the sub-scanning direction is composed of a suitable number of lines that is equal to or less than the total number of dot deposition points in the sub-scanning direction (sub-scanning pixel count), and is preferably composed of the number of lines that is equal to the number of dot deposition points corresponding to 1 mm or more on a print job. The local variation matrix 120 is repeatedly applied in the sub-scanning direction, since nonuniformity in the form of streaks produced by the one-pass method appears in the sub-scanning direction.

Figure 10:
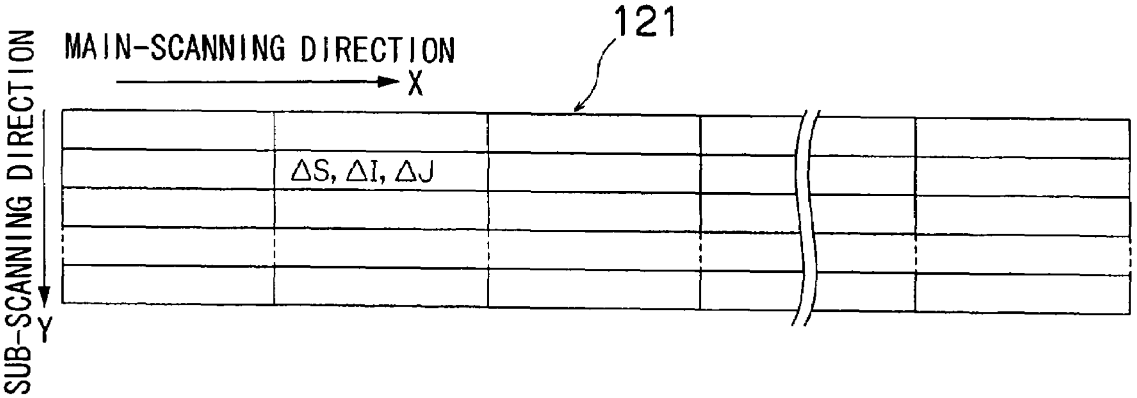
FIG. 10 is a drawing showing an example of a local variation matrix.

FIG. 10 is a drawing showing an example of a local variation matrix. The size variation value (ΔS) and the position variation value (ΔI, ΔJ) are stored for each element (cell) of the local variation matrix 121 shown in FIG. 10. In other words, ΔS shows the amount of change in the dot size, ΔI shows the amount of change in the position in the X-axis direction (the main scanning direction), and ΔJ shows the amount of change in the position in the Y-axis direction (the sub-scanning direction).

ΔS may be a positive or negative value in accordance with the increase or decrease in dot size. In other words, ΔS is a negative value when the dot size is reduced, and ΔS is a positive value when the dot size is increased.

The digital halftoning result D(I, J) expresses the dot size S at the position (I, J). When D(I, J) is inputted, ΔS, ΔI, and ΔJ are looked up in the local variation matrix corresponding to the position (I, J), yielding a signal D'(I', J') that has undergone local variation processing, in other words, a position I'=I+ΔI, J'=J+ΔJ, and a dot size S+ΔS.

When the dot size S+ΔS exceeds the controllable range of the dot size, this size is assumed to be the maximum or minimum controllable size.

Figure 11:
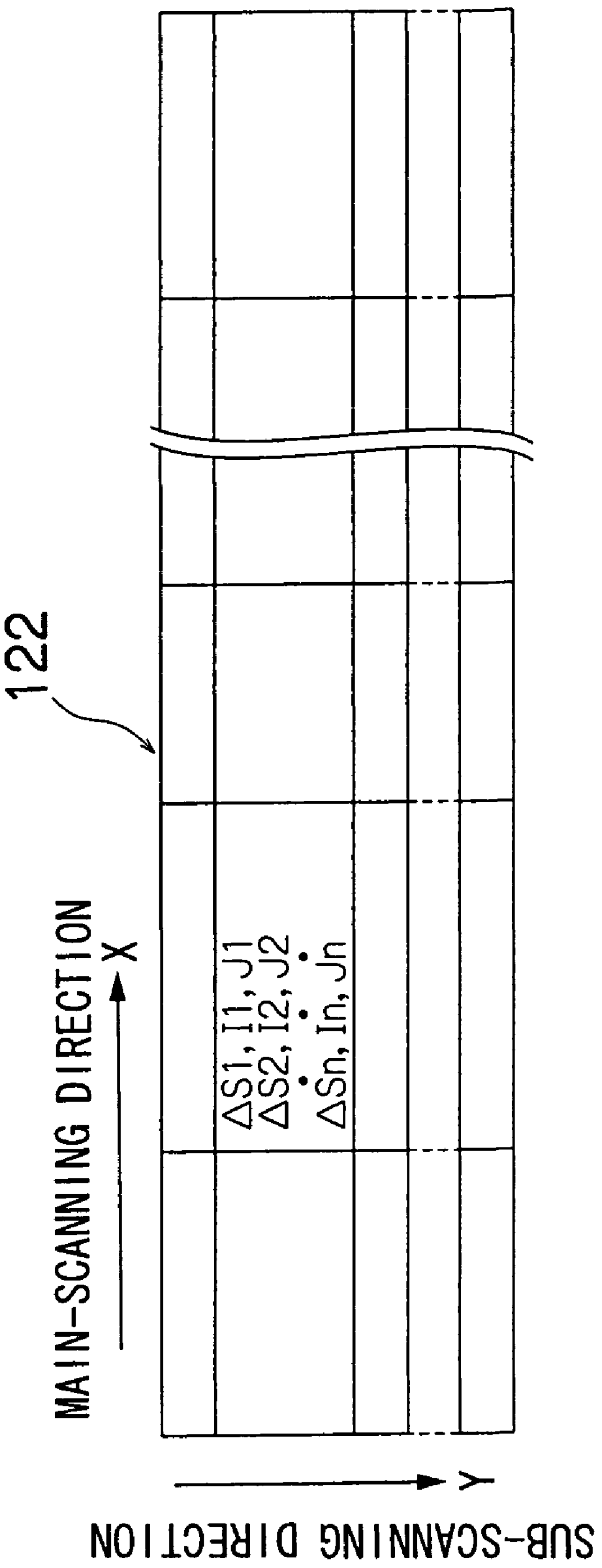
FIG. 11 is a drawing showing another example of a local variation matrix.

FIG. 11 is a drawing showing another example of a local variation matrix. The local variation matrix 122 shown in FIG. 11 is a matrix that has a one-to-one relationship with the ink-droplet deposition positions, and a plurality (k=1, 2, . . . n) of dot size values ΔSk and dot positions (Ik, Jk) are stored in each element according to their inputted dot size.

When the digital halftoning result D(I, J)=(position I, J; dot size S1) is inputted, a plurality of stored values ΔS1, I1, J1, ΔS2, I2, J2, . . . , ΔSn, In, Jn are looked up in the local variation matrix 122 corresponding to the position (I, J).

Then, D1(I1, J1)=(position I1, J1; dot size+ΔS1), D2(I2, J2)=(position I2,J2; dot size+ΔS2), . . . , Dn(In, Jn)=(position In, Jn; dot size+ΔSn) are obtained as a signal that has undergone local variation processing. In the case of input in which corresponding dots are blank, the signal is assumed to be 0+ΔS.

The local variation processing shown in FIG. 11 is an aspect in which a plurality of dots D1(I1, J1) to Dn(In, Jn) are associated with a single dot D(I, J), which is the result of digital halftoning. As the final image, all the ΔS of the plurality of dots that correspond to the position (I', J') are added (subtracted in the case that the sign of the value is negative). When the total dot size exceeds the controllable range of the dot size, the size is assumed to be the maximum or minimum controllable size.

Next, the method for creating a local variation matrix is described.

Figure 12:
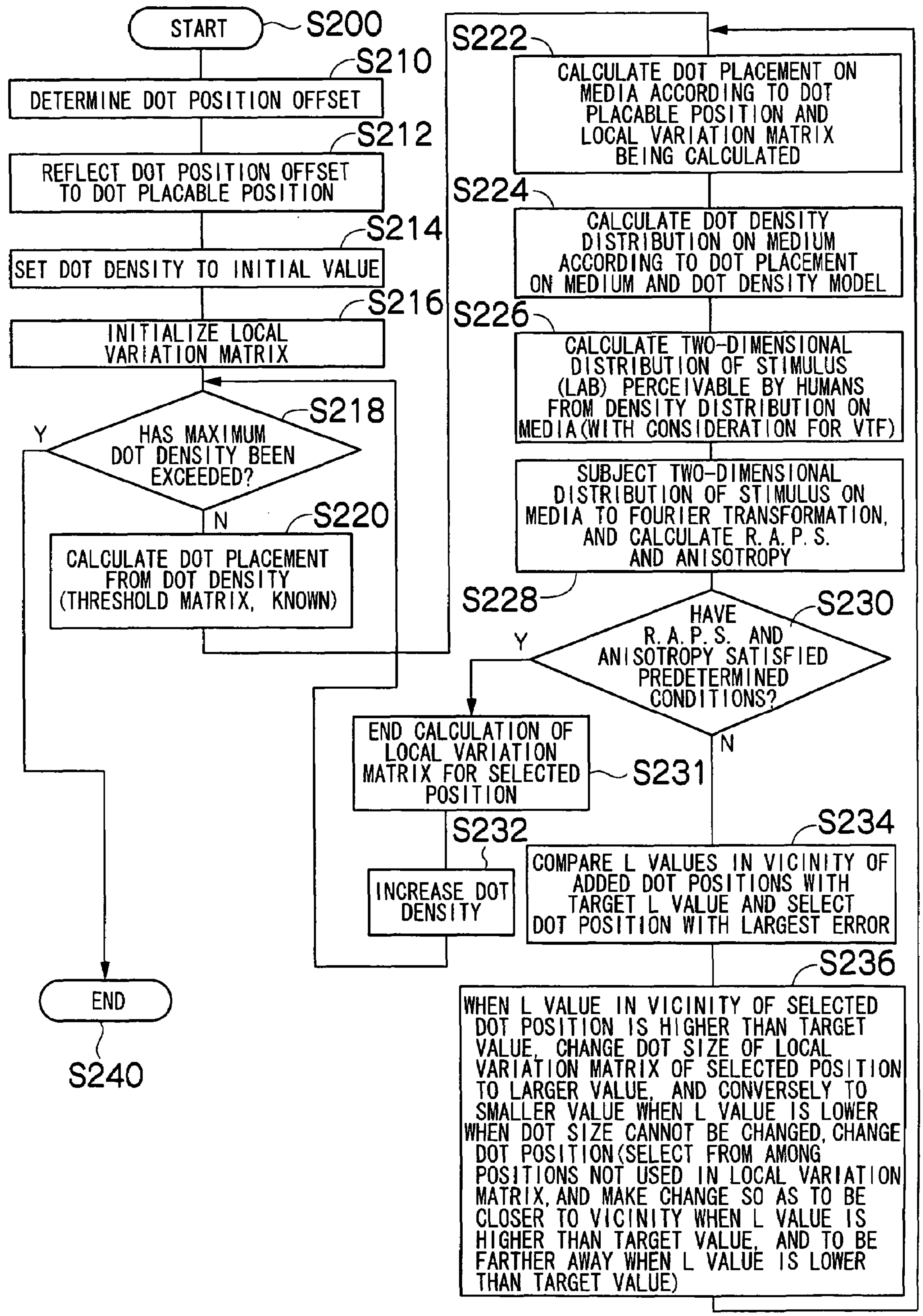
FIG. 12 is a flowchart showing the procedure for creating the local variation matrix shown in FIG. 10.

FIG. 12 is a flowchart showing the procedure for creating the local variation matrix 121 shown in FIG. 10.

As shown in FIG. 12, when processing for creating a local variation matrix is started (step S200), processing for determining the dot position offset is carried out first (step S210). This is processing for determining the locality of nozzles, and displacement from the ideal state related to the dot position, dot size, dot shape, dot density distribution, and the like is determined according to image read information obtained from the print determination unit 24. When determining the nozzle locality, the factors that vary each time and the factors that remain constant in the nozzle locality are preferably separated, and the factors that remain constant are preferably used in the local variation processing.

Performed next is processing for reflecting the dot position offset to a position in which dot placement is allowed (step S212). A grid of dot depositions brought about in an ideal state in which defective nozzles are not present (i.e., an ideal grid) is composed of discrete coordinate values with a fixed spacing set by the nozzle pitch and the ejection pitch in the sub-scanning direction. In contrast to this, when there is a locality of nozzles, dots are deposited between ideal grid points. The processing in step S212 may be analogous to considering an object which is more like a fine grid-like net (mesh) than the ideal grid and which actually controls the positions in which dot placement is allowed.

Processing is thereafter performed for setting the dot density, which is one of the computational parameters, to its initial value (step S214). Given a certain surface area, the dot density is a value expressed as a percentage of the number of dots in the surface area, where 100% represents the surface area that is completely filled with dots at the highest possible ejection density. Here, the initial setting is the smallest value in terms of control.

Next, processing for initializing the local variation matrix is performed (step S216). The initial local variation matrix is a table that does not provide any change with respect to the results of digital halftoning.

Then, determination processing is carried out in step S218. As the dot density is gradually increased in the calculating process of matrix creation and the calculation is repeated, this determination unit performs a loop determination to end processing if a certain maximum dot density is reached.

The maximum dot density expresses the usable range that is defined as the percentage up to which dot density is used at its maximum, and is determined by system conditions such as the maximum density value, or the percentage of dots that can actually be ejected.

In the determination of step S218, if the current value of the dot density has not exceeded the maximum dot density, the process advances to step S220 and the dot placement is calculated from the dot density thereof. In other words, in step S220, dot placement is calculated using a certain type of digital halftoning. Here, a known halftoning technique using a threshold value matrix is applied, and the result thereof is fitted into a position in which dot placement is allowed. Digital halftoning through the use of a threshold matrix entails adding dots to unassigned positions in the increased portion of the dot density without changing the location of dots that have already been placed, even if the dot density is changed. Therefore, the placement of dots can be sequentially calculated while the dot density is gradually increased from the initial value of the dot density.

Next, dot placement on the print medium is calculated (step S222) according to the local variation matrix currently being calculated and on the positions in which dots may be placed from the dot placement calculated in step S220. In steps S210 to S212 described above, the nozzle locality is determined, and droplets should ideally be ejected onto a certain grid point (ideal grid point), but it has been determined that a droplet is actually deposited to a position displaced from the ideal grid point. In other words, in step S222, calculation is carried out so that the position of the dots to be added that has been calculated by digital halftoning in step S220 is actually be deposited by the action of the nozzle locality to a certain displaced position in which dot is placeable.

Then, the dot density distribution on the media is calculated (step S224) according to the dot placement on the media and the dot density model. This calculation is performed by simulating what the density distribution of the dot placement calculated in step S222 will be on the actual media.

Thereafter, processing for evaluating the simulation results is performed. In other words, a two-dimensional distribution of a stimulus (CIE-LAB) that humans can perceive is calculated (step S226) from the calculated density distribution on the media. Consideration is given at this time to the visual transfer function (VTF).

Figure 13:
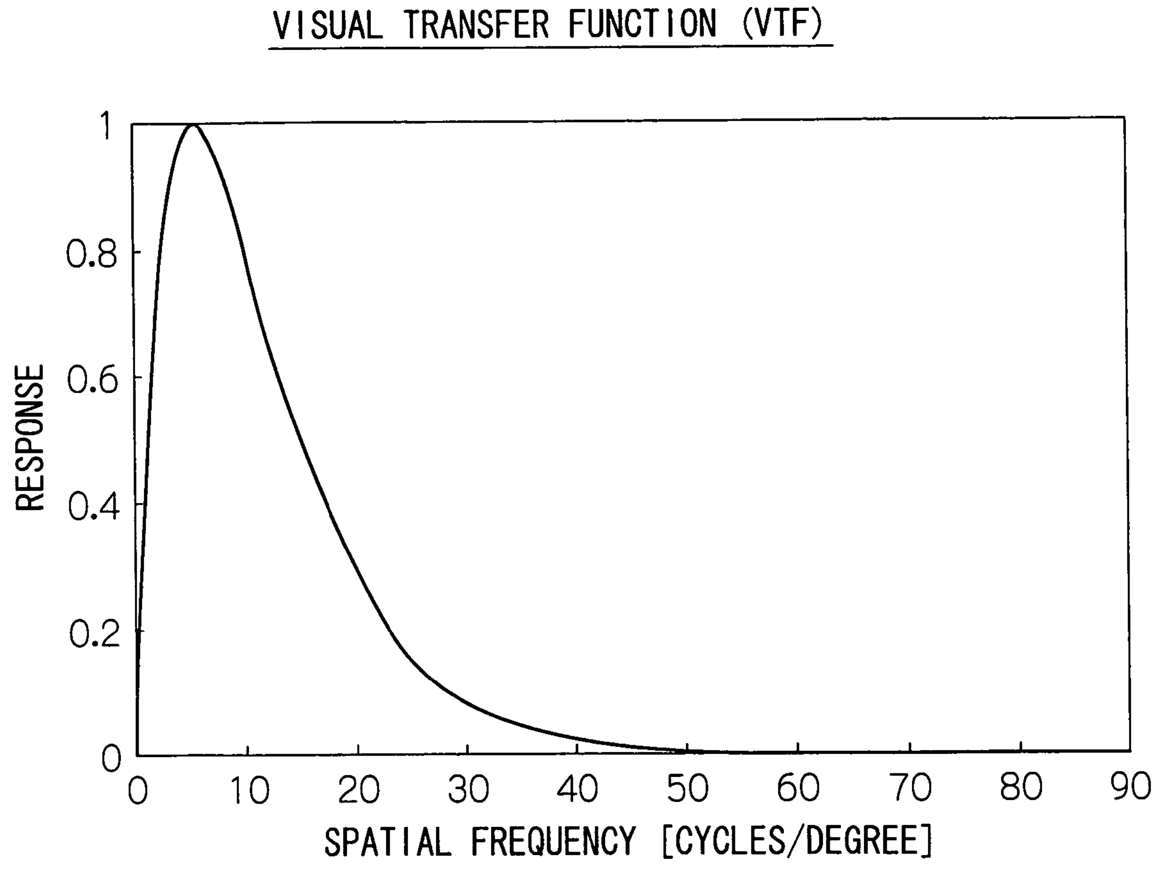
FIG. 13 is a graph showing the human visual transfer function (VTF)

FIG. 13 is a graph showing the human visual transfer function. The horizontal axis shows spatial frequencies (cycles/degree), and the vertical axis shows response values. As shown in FIG. 13, response is high in a certain low frequency range, and is reduced in a high frequency range. The visual resolution limit at the least distance of distinct vision (286 mm) is commonly said to be 50 (cycles/degree), and the gradation discrimination ability to be 200 gradations.

According to Dooley, the visual transfer function can be approximated with the following equation 1:

$$VTF=5.05\times(e^{-0.138f})\times(1-e^{-0.1f}) \tag{1}$$

where f is the spatial frequency (cycles/degree).

In other words, this signifies that the nonuniformity of the dots at a high frequency is essentially reduced.

Next, the two-dimensional distribution of the stimulus on the media is subjected to Fourier transformation, and a radially averaged power spectrum (R.A.P.S.) and a dispersive spectrum (anisotropy) are calculated (Step S228 in FIG. 12). An evaluation method that uses these averaged spectrum (R.A.P.S.) and dispersive spectrum (anisotropy) is described in detail in “Digital Halftoning” (The MIT Press), by Robert Ulichney.

A dot pattern is obtained as a result of digital halftoning, and the above-described averaged spectrum (R.A.P.S.) and dispersive spectrum (anisotropy) are used to evaluate the formation of streak nonuniformity in this dot pattern (dot placement).

Figure 14:
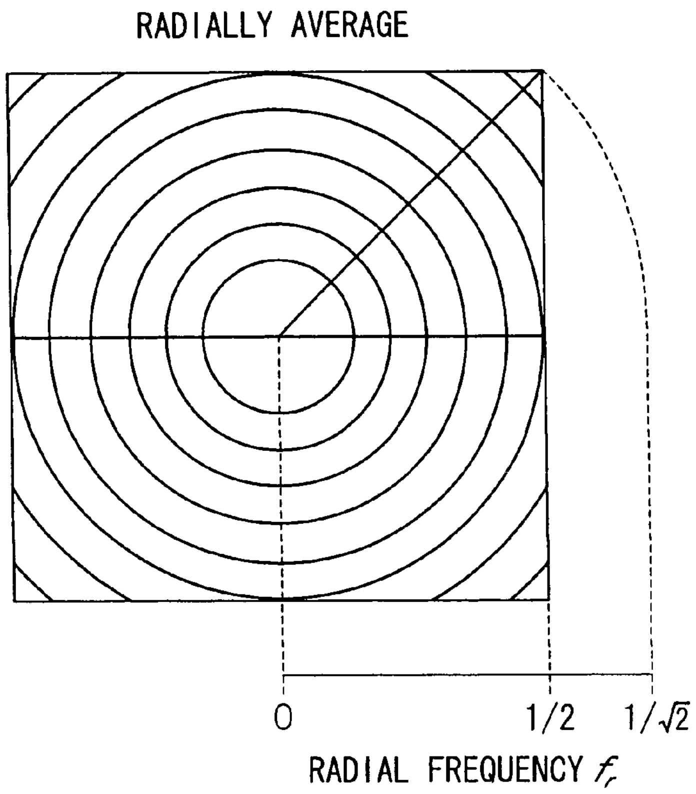
FIG. 14 is a drawing showing a coordinate system for calculating a two-dimensional power spectrum.

In other words, the two-dimensional power spectrum of the dot placement is converted to radial coordinates, as in FIG. 14, and the index corresponding to the average and dispersion of the spectrum at all angles is calculated for the spatial frequency fr corresponding to the radius of the radial coordinates.

The radially averaged power spectrum (R.A.P.S.) is expressed by the following equation 2:

$$P_r(f_r)=\frac{1}{N_r(f_r)}\sum_{i=1}^{N_r(f_r)}\hat{P}(f). \tag{2}$$

The anisotropy is expressed by the following equation 3:

$$s^2(f_r)=\frac{1}{N_r(f_r)-1}\sum_{i=1}^{N_r(f_r)}\left(\hat{P}(f)-P_r(f_r)\right)^2 \tag{3}$$

$$\text{anisotropy}=\frac{s^2(f_r)}{P_r^2(f_r)}.$$

The radially averaged power spectrum (R.A.P.S.) is a spectrum related to the visibility of the dot placement, and the dispersive spectrum is a spectrum related to the anisotropy of the dot placement.

Figure 15:
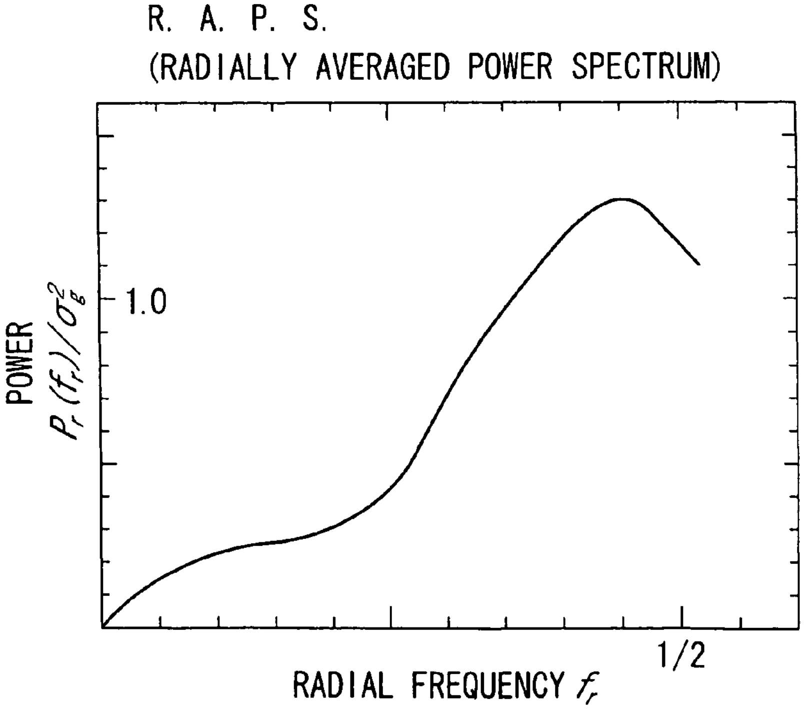
FIG. 15 is a graph showing an example of a radially averaged power spectrum (R.A.P.S) calculated under certain preferred conditions.

An example of R.A.P.S. calculated under certain preferable conditions is shown in FIG. 15. In this graph, the visual transfer function has not been considered. Considering the visual transfer function (VTF) described in FIG. 13, the overall energy can be kept to a low level. In FIG. 15, $\sigma_g$ is expressed by the following equation 4:

$$\sigma_g=g(1-g) \tag{4}$$

where g is the normalized inputted value, and $0\leqq g\leqq 1$.

Figure 16:
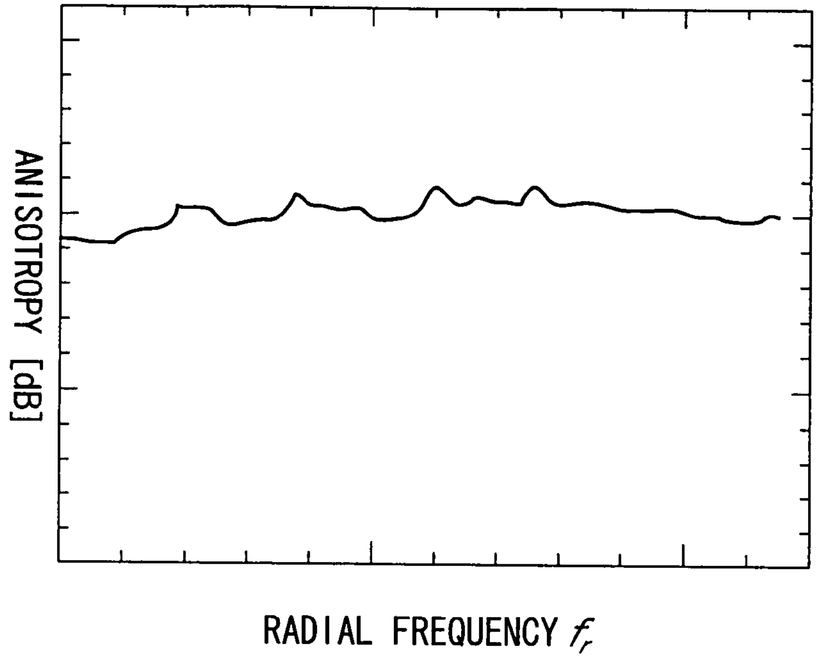
FIG. 16 is a graph showing an example of anisotropy of a radial power spectrum calculated under certain preferred conditions.

FIG. 16 shows an example of anisotropy of a radial power spectrum calculated under certain preferred conditions.

According to Robert Ulichney, if the anisotropy of a radial power spectrum is −10 dB or less, then the anisotropy of the dot does not stand out.

Using the evaluation method described above, a determination is made in step S230 in FIG. 12 as to whether the averaged spectrum (R.A.P.S.) and the dispersive spectrum (anisotropy) satisfy certain respective conditions.

When predetermined conditions that are the criteria are satisfied in step S230, the local variation matrix is in a state in which nonuniformity is not generated with respect to the current dot density, and the determination is made as YES, and calculation of the local variation matrix for the selected position ends (step S231). The dot density is thereafter increased (step S232), and the process returns to step S218 to repeat the same processing described above.

On the other hand, when the determination is made as NO in step S230, it is possible that nonuniformity has been generated by additionally placed dots due to a change in the dot density. The fact that there is nonuniformity in the area of the newly added dots indicates that there are considerable errors between the target L value in the area of the added dots and the realized L values. The location at which the error from the target L value is greatest is thought to be the dot contributing to the cause of nonuniformity, and processing for selecting the dot position effective for the nonuniformity is carried out (step S234).

Figure 17:
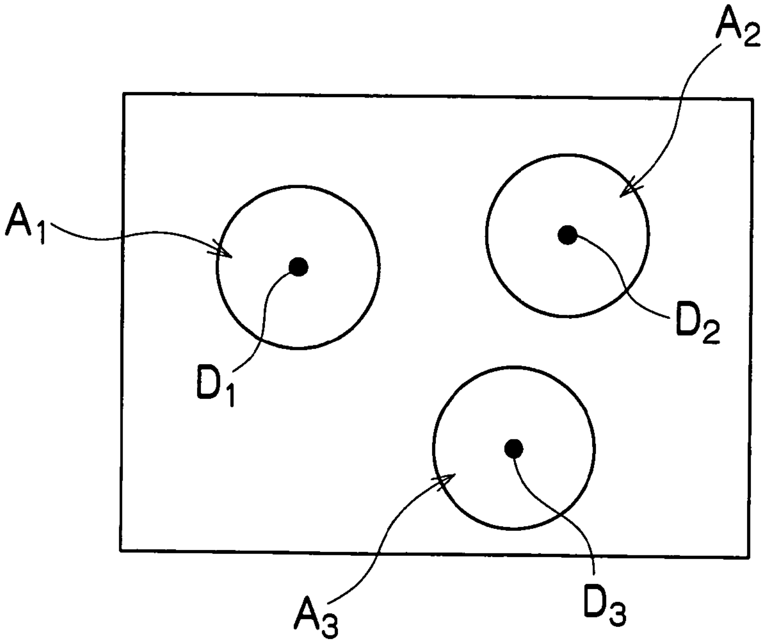
FIG. 17 is a descriptive drawing exemplifying the relationship between the proximate region and the dot position to be added.

Specifically, of the dot positions to be added, the dot position with the largest error in the L value in comparison to the nearby L values is determined. As shown in FIG. 17, the error relative to the target L value is calculated for each of the areas A1, A2, and A3 that surround the dot positions D1, D2, and D3 to be added, and the dot position with the largest error is selected.

Figure 18:
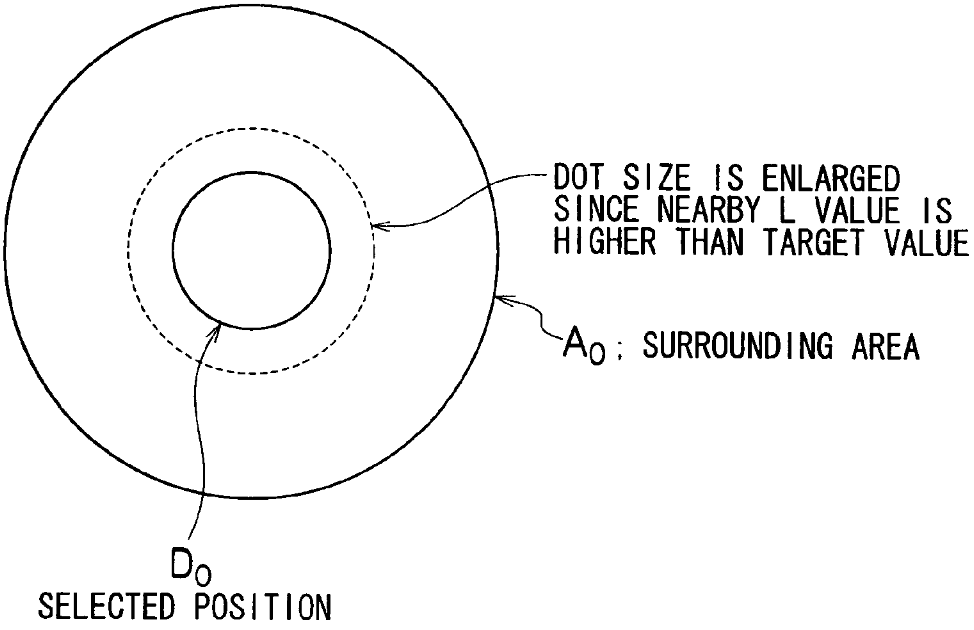
FIG. 18 is a descriptive drawing exemplifying the enlargement of the dot size in the local variation processing.
Figure 19:
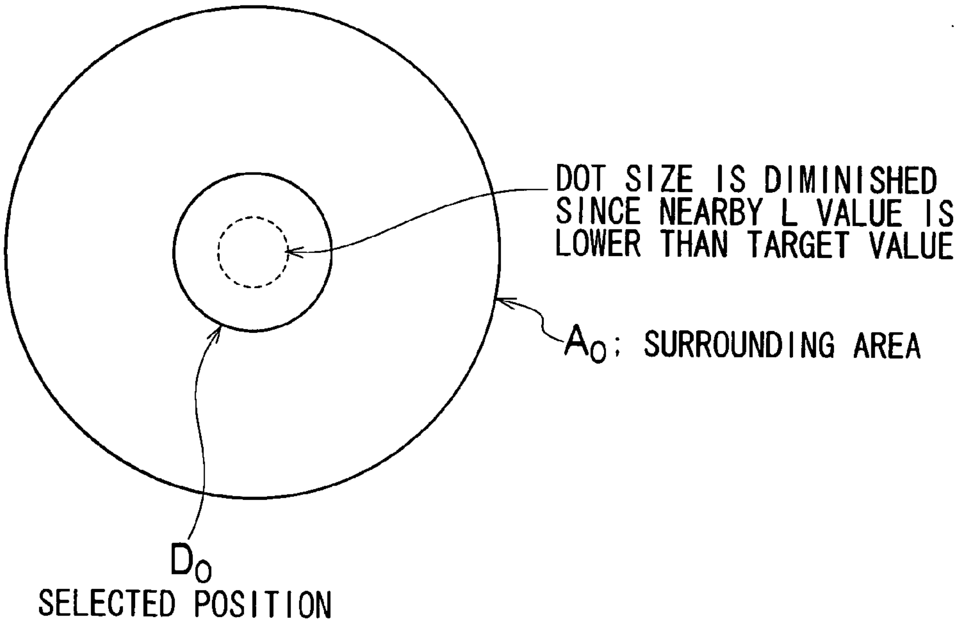
FIG. 19 is a descriptive drawing exemplifying the diminishment of the dot size in the local variation processing.

Thus, when the nearby L value of the selected dot position is higher than the target value, the dot size of the local variation matrix of the selected position is changed to a larger value as shown in FIG. 18, and conversely, when the nearby L value is lower than the target value, the dot size is changed to a smaller value as shown in FIG. 19 (step S236 in FIG. 12). In FIGS. 18 and 19, the inner circle D0 drawn with the solid line represents the selected position, and the circle A0 drawn with the solid line concentric with the circle D0 represents the surrounding area. FIG. 18 shows that the dot size of the selected position is changed to the larger value represented with the dashed line, when the nearby L value of the selected dot position is higher than the target value. FIG. 19 shows that the dot size is changed to the smaller value represented with the dashed line, when the nearby L value is lower than the target value.

However, when the dot size cannot be changed because it can only be changed within a certain limited range, the dot position is changed (step S236 in FIG. 12).

Figure 20:
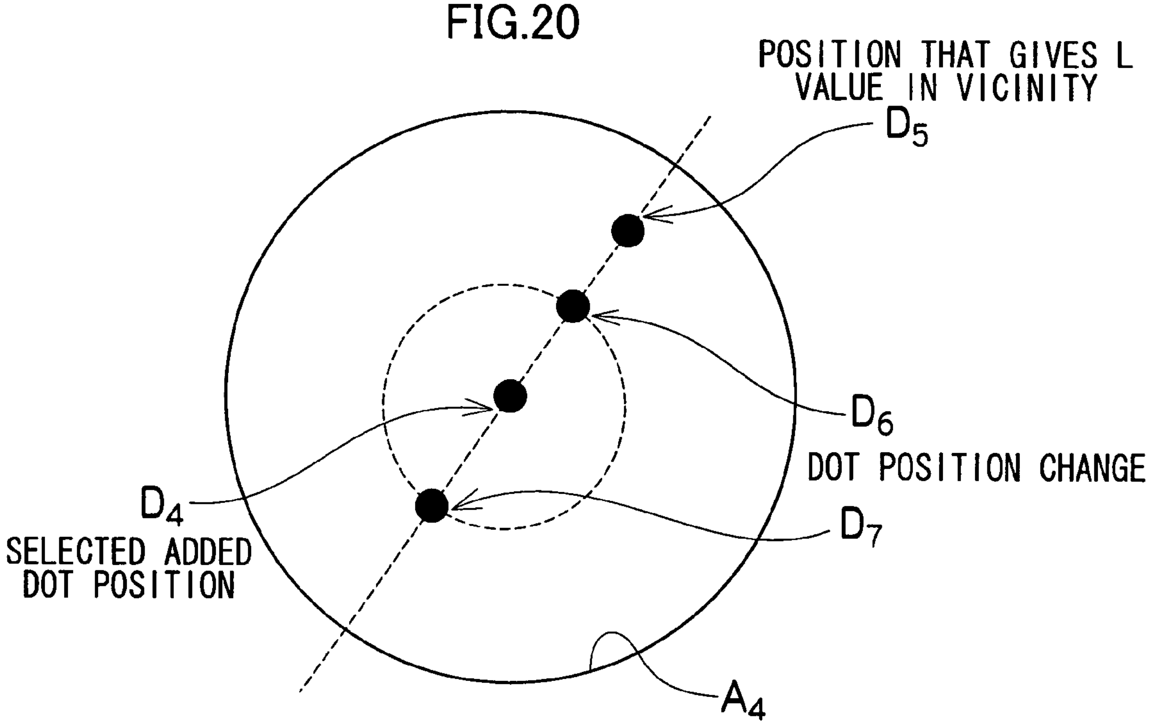
FIG. 20 is a descriptive drawing exemplifying a method of changing the dot position.

FIG. 20 shows an example of a method of changing the dot position. The dot position D4 shown in the center of FIG. 20 indicates the dot position related to a selected addition in step S232, and the inside of the solid circle whose center is the dot position D4 shows the surrounding area A4.

When is it is not possible to control the dot size at the dot position D4, another dot position is determined from among the positions not yet used in the local variation matrix within the surrounding area A4. Specifically, a straight line (the straight line indicated by the dashed line in FIG. 20) is drawn from a position D5 that gives the nearby L value inside the surrounding area A4, to the added dot position D4 related to the selection, and the dot position is changed to an interior division point D6 (e.g., interior divisional ratio of 1:1) of the line segment D4-D5, to an exterior division point D7 (e.g., exterior divisional ratio of 1:2) of the line segment D4-D5, or to the vicinity thereof.

When the nearby L value is higher than the target value, then the dot position is changed so as to be more proximate to the position D5 for giving the nearby L value. Conversely, when the nearby L value is lower than the target value, then the dot position is changed so as to be farther away from the position D5.

According to the dot placement corrected in this manner, the process returns to step S222 to perform a new evaluation. By repeating the processing of steps S222 through S236, the parameters of the local variation matrix are sequentially determined.

When calculation is completed up to the maximum density, a single local variation matrix is finally completed. Then, the determination in step S218 of FIG. 12 is made as YES, and processing for creating the matrix ends (step S240).

Thus, the dot densities are calculated as they are sequentially made higher, so that a desirable reduction effect in streak nonuniformity can be expected even with an intermediate dot density.

Instead of the method described in FIG. 12, a method to set the initial value of the dot density to the maximum dot density may also be considered as a simpler method. In other words, when giving priority to solid printing with the maximum dot density to reduce nonuniformity, it is also possible to focus solely on the maximum dot density in this manner to determine the local variation matrix.

Next, another method for creating local variation matrix is described.

Figure 21:
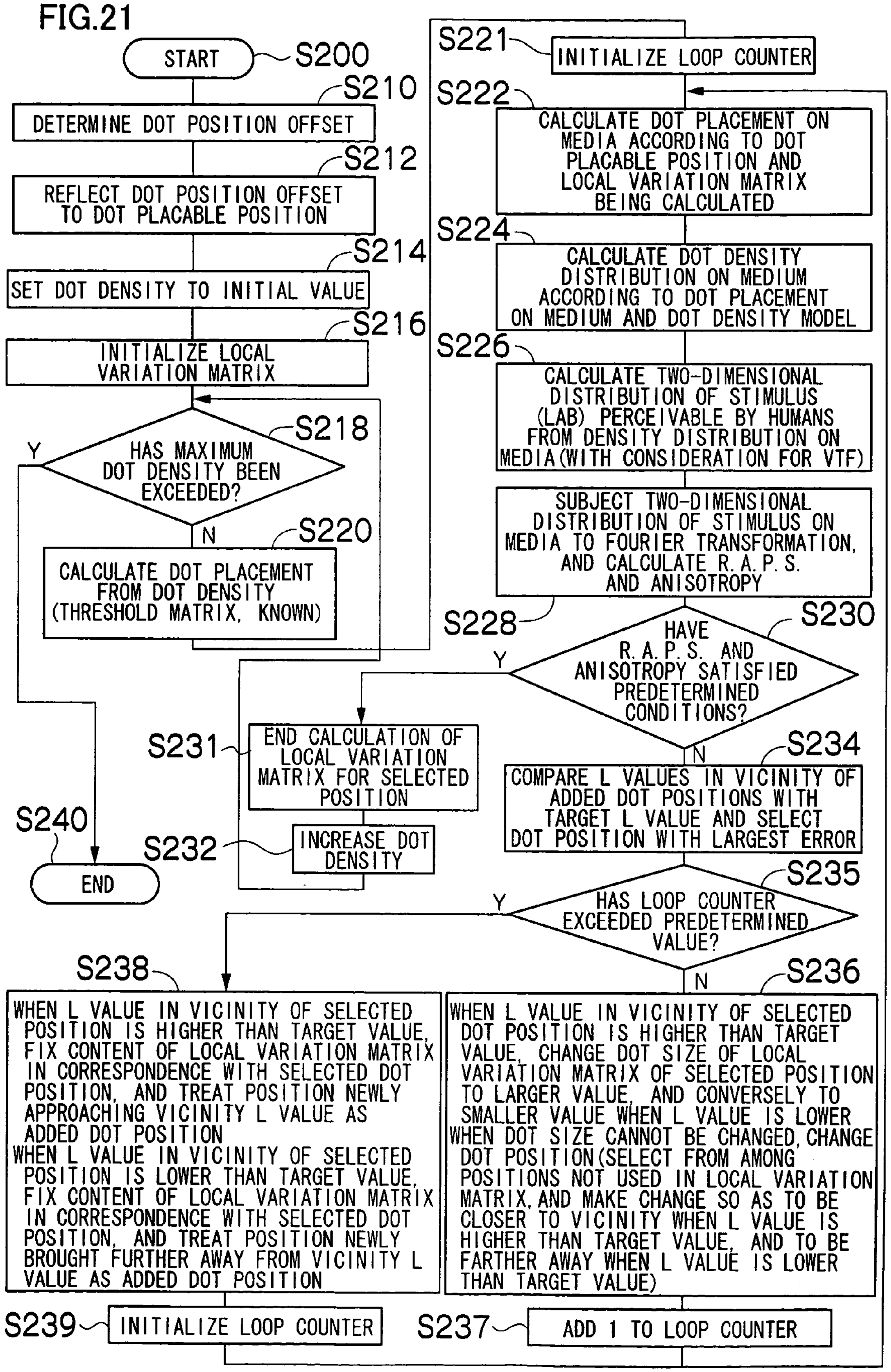
FIG. 21 is a flowchart showing the procedure for creating the local variation matrix shown in FIG. 11.

FIG. 21 is a flowchart showing the procedure for creating the local variation matrix 122 shown in FIG. 11. The same steps in FIG. 21 as FIG. 12 are assigned with the same step numbers as FIG. 12, and descriptions thereof are omitted.

The principal difference between the flowchart described in FIG. 12 and the flowchart shown in FIG. 21 is the addition of initialization processing for a loop counter (step S221), determination processing for the loop counter (step S235), additional processing for dot positions (step S238), and the like.

More specifically, after dot placement is calculated from the dot density in step S220, the loop counter is then initialized (step S221), and the process advances to step S222. An evaluation of the dot placement is performed in steps S222 through S230, the dot position with the largest error is selected by comparing the nearby L values with a target value in step S234, and a determination is made thereafter as to whether the loop counter has exceeded a predetermined value (step S235).

When the loop counter has not exceeded the predetermined value (when the determination is made as NO), the process advances to step S236, and processing for changing the dot size or the dot position is carried out. After step S236, 1 is added to the loop counter (step S237), and the process returns to step S222. In other words, the attempt with changing the dot size or the dot position (step S236) is made for the upper limit of a predetermined count.

When it is determined that the loop counter has exceeded the predetermined value in step S235, the process advances to step S238. In step S238, when the nearby L value of the selected position is higher than the target value, the content of the local variation matrix corresponding to the selected dot position is fixed, and the position approaching the position that gives a new nearby L value is treated as the added dot position. On the other hand, when the nearby L value of the selected position is lower than the target value, the content of the local variation matrix corresponding to the selected dot position is fixed, and the position further away from the position that gives a new nearby L value is treated as the added dot position (step S238).

Thus, a plurality of dots are controlled, the loop counter is initialized (step S239), and the process returns to step S222.

The local variation matrix 122 described in FIG. 11 can be obtained by performing calculations in accordance with the flowchart shown in FIG. 21.

In the above description, the case of a single ink has been described for ease of description; however, the same applies to a plurality of inks. In the case of a plurality of inks, the parameters for local variation processing are preferably determined in the order from ink having the strongest visual effect (in the order of colors K, M, C, Y, for example). High-quality parameters can be created by maximizing the degree of freedom when calculating for the ink with the strongest visual effect.

In the case where the parameter calculation for local variation processing has already been completed for one ink, the effect of ink that has already been determined is preferably taken into consideration in dot placement calculation thereafter when calculating the brightness distribution that humans can perceive on the media.

It is preferable to visually eliminate nonuniformity in the sub-scanning direction by varying the sizes of the parameters for the local variation amount generation processing in the sub-scanning direction with respect to differing colors so as not to allow iterative cycles in the sub-scanning direction to match each other.

Figure 22:
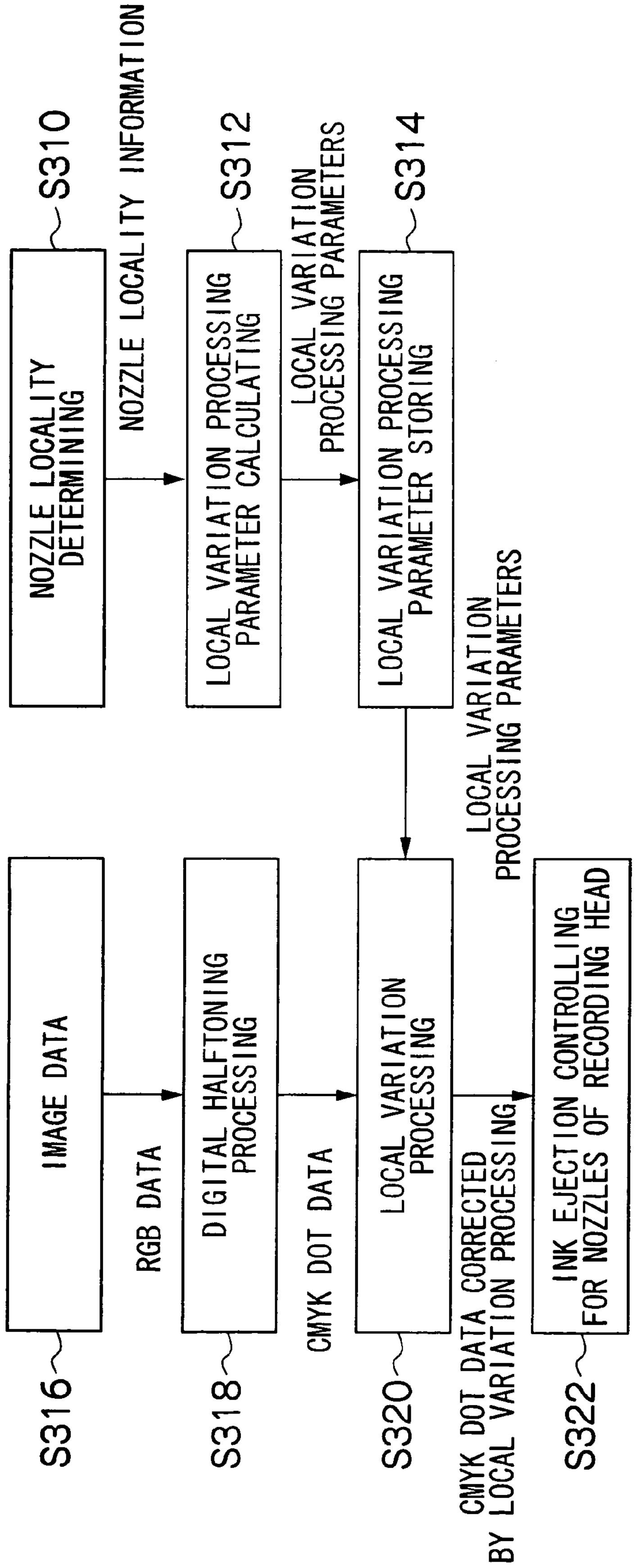
FIG. 22 is a flowchart showing the procedure of the image forming method according to the present embodiment.

FIG. 22 is a flowchart showing the procedure of the image forming method according to the present embodiment. As shown in FIG. 22, the nozzle locality information showing displacement from an ideal state of dot depositions due to defectiveness of the nozzles is acquired first at the nozzle locality determining step (step S310).

According to the acquired nozzle locality information, the local variation processing parameters for compensating the nozzle locality are calculated at the local variation processing parameter calculating step (step S312).

The calculated local variation processing parameters are stored in the storage device (e.g., the image memory 74, or an EEPROM (not shown)) at the storing step (step S314).

On the other hand, when the image data (RGB data) is inputted through the communication interface 70 described with reference to FIG. 6 (step S316 in FIG. 22), the inputted image data is converted to the CMYK dot data in the digital halftoning processing step (step S318).

The CMYK dot data obtained in the digital halftoning processing step S318 is varied so as to compensate the nozzle locality by using the local variation processing parameters stored in the storing step S314 (step S320).

According to the corrected CMYK dot data generated by the local variation processing in the local variation processing step S320, the ink ejection of the plurality of nozzles of the recording head (the print head 50) is controlled in the ink ejection controlling step (step S322) so that printing (image forming) is performed.

In the embodiments described above, the inkjet recording apparatus equipped with the full-line print head is described as an example; however, the range of applicability of the present invention is not limited thereby. The present invention may also be applied to a case shown in FIGS. 23A and 23B where an image forming (recording) is performed by carrying out a plurality of scanning using a line head (hereinafter referred to as a print head 150) that has a nozzle row shorter than the width Wm of a recording medium 136 (i.e., a printing medium such as the recording paper 16, and the like).

Figure 23B:
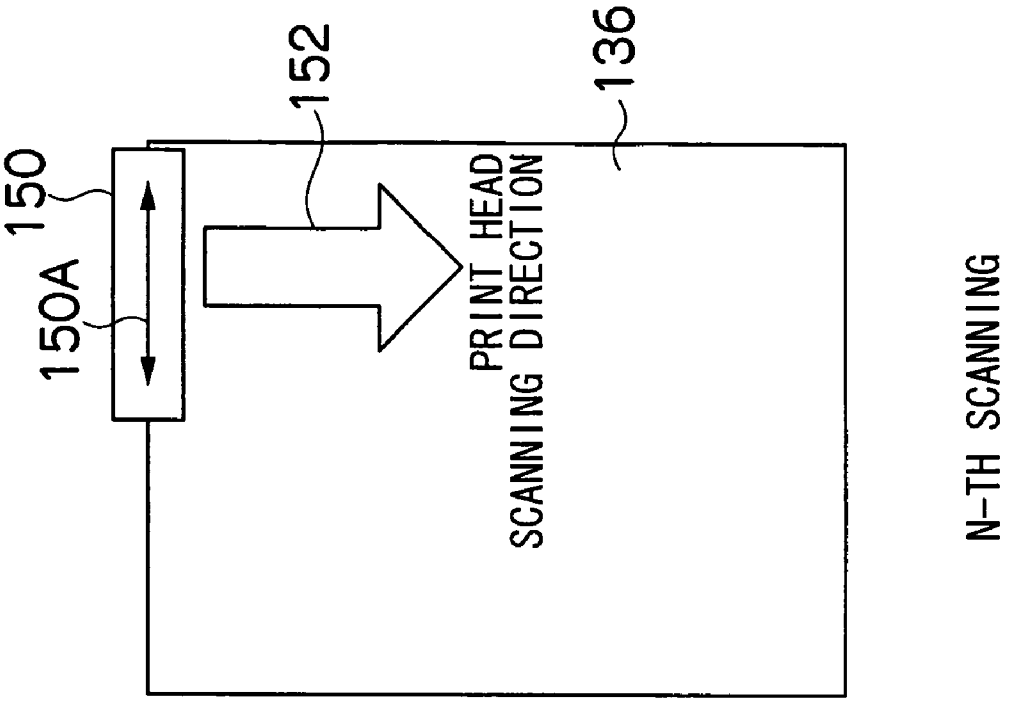
FIGS. 23A and 23B are conceptual drawings showing an embodiment of image forming using a scanning print head.
Figure 23A:
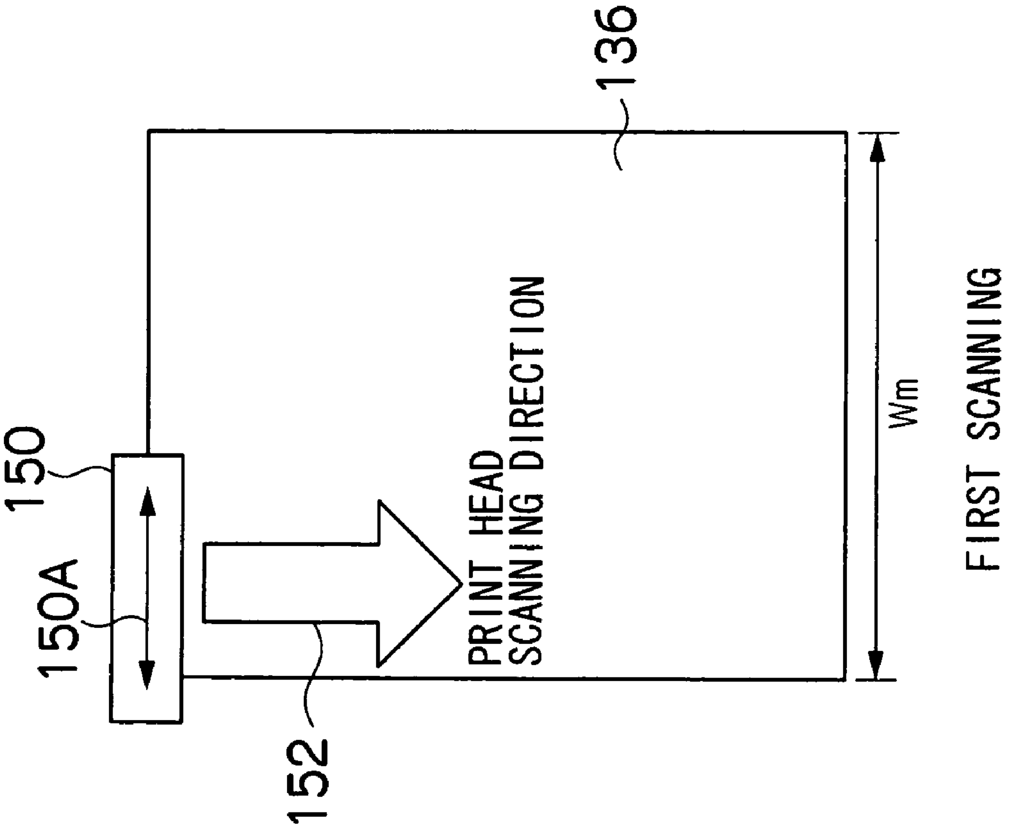

In FIGS. 23A and 23B, a two-headed arrow 150A represents the nozzle row direction and the nozzle low length in the print head 150, and an outlined arrow 152 represents the scanning direction of the print head 150. FIG. 23A shows the first scanning, and FIG. 23B shows the N-th (N is an integer larger than 1) scanning.

The print head 150 is arranged so that the lengthwise direction (the nozzle row direction) thereof is parallel with the widthwise direction of the recording medium 136. The print head 150 is movably held by a head moving part (not shown) including a carrying member such as a carriage, a running guide, or the like, and a driving device such as a motor; or the like to move the carrying member in both the print head scanning direction (the direction of the outlined arrow 152) and the widthwise direction of the recording medium 136 (the left and right directions in FIGS. 23A and 23B).

An image is formed on the recording medium 136 by carrying out a plurality of scanning in the print head scanning direction while the position of the print head 150 (the scanning position) is changed in the widthwise direction of the recording medium 136.

Although the print head 150 is moved in the present embodiment, it is sufficient to carry out the scanning while moving the print head 150 relatively to the recording medium 136. Then, it is acceptable to move the recording medium 136 with respect to the print head 150, or to carry out the scanning by moving both the recording medium 136 and the print head 150.

Figure 24:
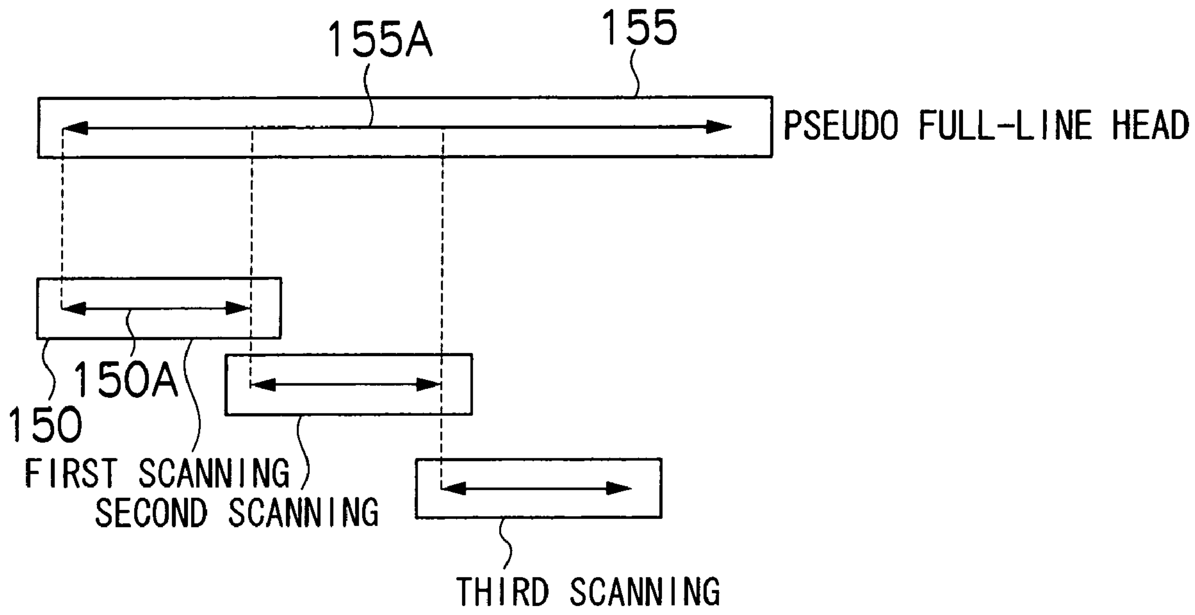
FIG. 24 is a descriptive drawing showing relationship between the print head performing a plurality of scanning and a pseudo full-line head.

As shown in FIGS. 23A and 23B, the print head 150 scans the recording medium 136 at different positions in the plurality of scanning. When regarding the nozzles in the print head 150, which are relatively moved on the recording medium 136 in the plurality of scanning, as nozzles at corresponding positions in a pseudo full-line head 155 having a length covering the width Wm of the print medium 136 as shown in FIG. 24, the print head 150 can be regarded as a portion of the pseudo full-line head 155 having a nozzle row 155A, of which length corresponds to the width Wm of the print medium 136. The algorithms according to the present invention are then applicable with respect to the pseudo full-line head 155 similarly to the full-line print head 50 in the above-described embodiments.

Figure 25B:
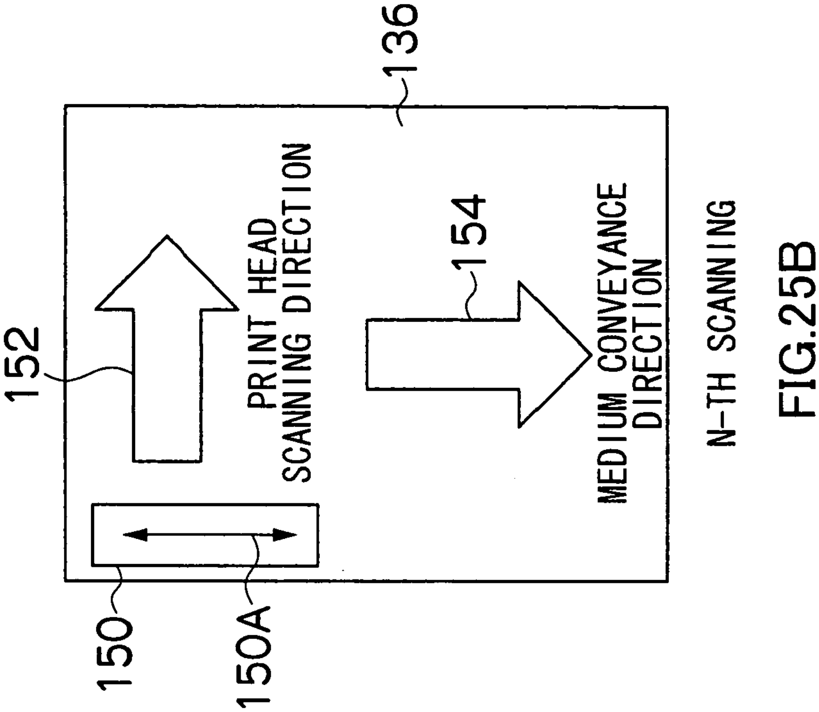
FIGS. 25A and 25B are conceptual drawings showing another embodiment of image forming using a scanning print head.
Figure 25A:
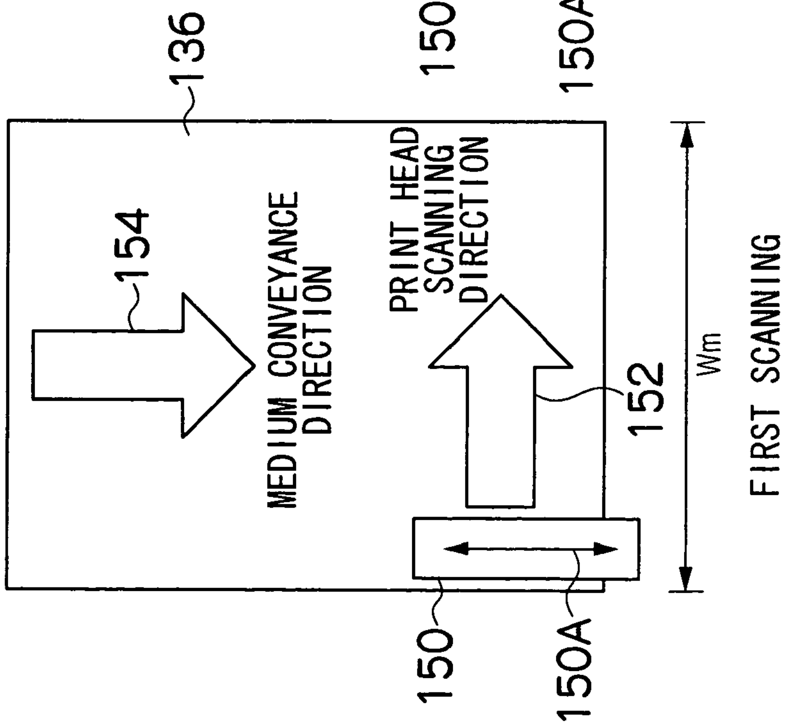
Figure 26:
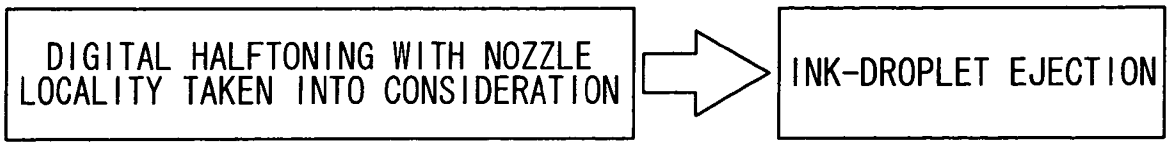
FIG. 26 is a block diagram showing a functional configuration of the conventional processing.

The algorithms according to the present invention are also applicable in a case shown in FIGS. 25A and 25B, where an image is formed by carrying out shuttle scanning of the print head 150, and the nozzles in the print head 150 can be regarded as nozzles in a pseudo full-line head similarly to the case shown in FIGS. 23A and 23B.

In FIGS. 25A and 25B, the same or similar parts with FIGS. 23A and 23B are denoted with the same reference numerals, and descriptions thereof are omitted.

In FIGS. 25A and 25B, the print head 150 is arranged so that the lengthwise direction (the nozzle row direction) thereof is parallel with the conveyance direction of the recording medium 136 (the medium conveyance direction represented with an outlined arrow 154), and the print head 150 scans the recording medium 136 in the direction substantially orthogonal to the medium conveyance direction.

An image is formed on the recording medium 136 by carrying out a plurality of scanning while the positions of the recording medium 136 and the print head 150 are changed relatively to each other by the scanning of the print head 150 and the conveyance of the recording medium 136.

In the embodiments described above, the inkjet recording apparatus is described as an example of the image recording apparatus; however, the range of applicability of the present invention is not limited thereby. Other than inkjet methods, the present invention may also be applied to thermal transfer recording apparatuses with a line head, LED electrophotographic printers, silver halide photographic printers with an LED line exposure head, and other types of image recording apparatuses (image forming apparatuses).

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An inkjet recording apparatus, comprising:

a recording head which has a nozzle row composed of a plurality of nozzles for ejecting ink;

a storage device which stores local variation processing parameters determined according to a nozzle locality showing displacement from an ideal state of dot depositions due to defectiveness of the nozzles;

a digital halftoning processing device which converts inputted image data to dot data;

a local variation processing device which receives the dot data from the digital halftoning processing device and varies the dot data so as to compensate a nozzle locality by using the local variation processing parameters stored in the storage device; and a control device which controls ink ejection of the plurality of nozzles of the recording head according to the dot data that has been varied by the local variation processing device.

2. The inkjet recording apparatus as defined in claim 1, further comprising:

an image reading device which acquires image information by reading an image formed on a print medium by the ink ejected from the nozzles of the print head;

a locality determination device which determines the nozzle locality according to the image information acquired by the image reading device; and a calculating device which calculates the local variation processing parameters for compensating the nozzle locality according to the nozzle locality determined by the locality determination device.

3. The inkjet recording apparatus as defined in claim 1, wherein the local variation processing device varies at least one of a dot size and a dot position.

4. The inkjet recording apparatus as defined in claim 1, wherein:

the local variation processing parameters include at least one of a dot position variation amount and a dot size variation amount;

the storage device stores a matrix table defining the local variation processing parameters corresponding to each ink-droplet deposition position; and the local variation processing device receives at least one of a dot position and a dot size obtained by the digital halftoning processing device, and generates an output in which the at least one of the dot position and the dot size is varied according to the matrix table.

5. The inkjet recording apparatus as defined in claim 4, wherein the matrix table is obtained by calculation as a dot density is sequentially increased.

6. The inkjet recording apparatus as defined in claim 4, wherein the matrix table is determined so as to satisfy prescribed conditions for at least one index from among an index related to visibility of dot placement and an index related to anisotropy of the dot placement.

7. An image forming method of forming an image on a printing medium using a recording head having a nozzle row composed of a plurality of nozzles for ejecting ink, the method comprising:

a locality determining step of determining nozzle locality showing displacement from an ideal state of dot depositions due to defectiveness of the nozzles;

a calculating step of calculating local variation processing parameters for compensating the nozzle locality according to the nozzle locality determined in the locality determining step;

a storing step of storing, in a storage device, the local variation processing parameters calculated in the calculating step;

a digital halftoning processing step of converting inputted image data to dot data with a digital halftoning method;

a local variation processing step of, after converting the inputted image data to dot data in the digital halftoning processing step, varying the dot data so as to compensate the nozzle locality by using the local variation processing parameters stored in the storage device; and a control step of controlling ink ejection of the plurality of nozzles of the recording head according to the dot data generated in the local variation processing step.

8. The image forming method as defined in claim 7, wherein the locality determining step comprises an image reading step of acquiring image information by reading an image formed on the print medium by the ink ejected from the nozzles of the print head, and determines the nozzle locality according to the image information acquired by the image reading step.

9. The image forming method as defined in claim 7, wherein the local variation processing step varies at least one of a dot size and a dot position.

10. The image forming method as defined in claim 7, wherein:

the local variation processing parameters include at least one of a dot position variation amount and a dot size variation amount;

the storing step stores, in the storage device, a matrix table defining the local variation processing parameters corresponding to each ink-droplet deposition position; and the local variation processing step receives at least one of a dot position and a dot size obtained by the digital halftoning processing, and generates an output in which the at least one of the dot position and the dot size is varied according to the matrix table.

11. The image forming method as defined in claim 10, wherein the matrix table is obtained by calculation as a dot density is sequentially increased.

12. The image forming method as defined in claim 10, wherein the matrix table is determined so as to satisfy prescribed conditions for at least one index from among an index related to visibility of dot placement and an index related to anisotropy of the dot placement.

* * * * *